US012671687B2

(12) United States Patent
Shibuichi et al.

(10) Patent No.: US 12,671,687 B2
(45) Date of Patent: Jun. 30, 2026

(54) SYSTEM, TERMINAL, CONTROL METHOD OF TERMINAL, AND STORAGE MEDIUM

(71) Applicant: NEC Corporation, Tokyo (JP)

(72) Inventors: Daisuke Shibuichi, Tokyo (JP); Yoshihisa Shingu, Tokyo (JP); Issei Yanagisawa, Tokyo (JP); Tomohide Ota, Tokyo (JP)

(73) Assignee: NEC CORPORATION, Tokyo (JP)

( * ) Notice: Subject to any disclaimer, the term of this patent is extended or adjusted under 35 U.S.C. 154(b) by 351 days.

(21) Appl. No.: 17/928,336

(22) PCT Filed: Jun. 23, 2022

(86) PCT No.: PCT/JP2022/025195
§ 371 (c)(1),
(2) Date: Nov. 29, 2022

(87) PCT Pub. No.: WO2023/248445
PCT Pub. Date: Dec. 28, 2023

(65) Prior Publication Data
US 2024/0236085 A1     Jul. 11, 2024

(51) Int. Cl.
*H04L 9/40*          (2022.01)
(52) U.S. Cl.
CPC ................................. *H04L 63/0861* (2013.01)
(58) Field of Classification Search
None
See application file for complete search history.

(56) References Cited

U.S. PATENT DOCUMENTS

2007/0288998 A1* 12/2007 Gudigara ................ G06F 21/32
                                                          726/5
2008/0077600 A1*  3/2008 Nakamura ............. G06Q 30/00
(Continued)

FOREIGN PATENT DOCUMENTS

JP          2005-293544 A      10/2005
JP          2007-172308 A       7/2007
(Continued)

OTHER PUBLICATIONS

International Search Report for PCT Application No. PCT/JP2022/025195, mailed on Sep. 13, 2022.
(Continued)

*Primary Examiner* — Syed A Roni
(74) *Attorney, Agent, or Firm* — Sughrue Mion, PLLC

(57)          ABSTRACT

A system includes a plurality of first server, a second server and a terminal. The plurality of first servers are operated by each of a plurality of service providers providing services using biometric authentication. The second server manages biometric authentication of each of the plurality of service providers. The terminal stores original biometric information that is an original of authentication information used for biometric authentication. The terminal transmits the original biometric information to the second server in response to a request from the second server. The second server transmits the original biometric information to the first server of the service provider selected by the user from among the plurality of service providers. The first server generates authentication information for registration from the original biometric information.

17 Claims, 23 Drawing Sheets

(56)        References Cited

U.S. PATENT DOCUMENTS

| | | | | |
|---|---|---|---|---|
| 2014/0147020 | A1* | 5/2014 | Baldwin | H04N 21/2541 |
| | | | | 382/118 |
| 2015/0156197 | A1* | 6/2015 | Teh | H04L 67/535 |
| | | | | 713/186 |
| 2017/0278122 | A1* | 9/2017 | Kaehler | G06V 10/95 |
| 2022/0329589 | A1* | 10/2022 | Buscemi | G06F 21/32 |

FOREIGN PATENT DOCUMENTS

| | | | |
|---|---|---|---|
| JP | 2011-134030 | A | 7/2011 |
| JP | 5940186 | B1 | 6/2016 |
| JP | 2019-067075 | A | 4/2019 |
| JP | 2020-077421 | A | 5/2020 |
| JP | 2020-126337 | A | 8/2020 |
| JP | 2021-068371 | A | 4/2021 |
| JP | 2022-045822 | A | 3/2022 |
| WO | 2015/068694 | A1 | 5/2015 |
| WO | 2022/018792 | A1 | 1/2022 |

OTHER PUBLICATIONS

Written opinion for PCT Application No. PCT/JP2022/025195, mailed on Sep. 13, 2022.
JP Office Action for corresponding JP Application No. JP2022-557686, mailed on Oct. 18, 2022 with English translation.
JP Office Action for corresponding JP Application No. JP2022-557686, mailed on Nov. 1, 2022 with English translation.

* cited by examiner

MANAGEMENT CENTER

LOGIN INFORMATION, ETC.

Figure 5:
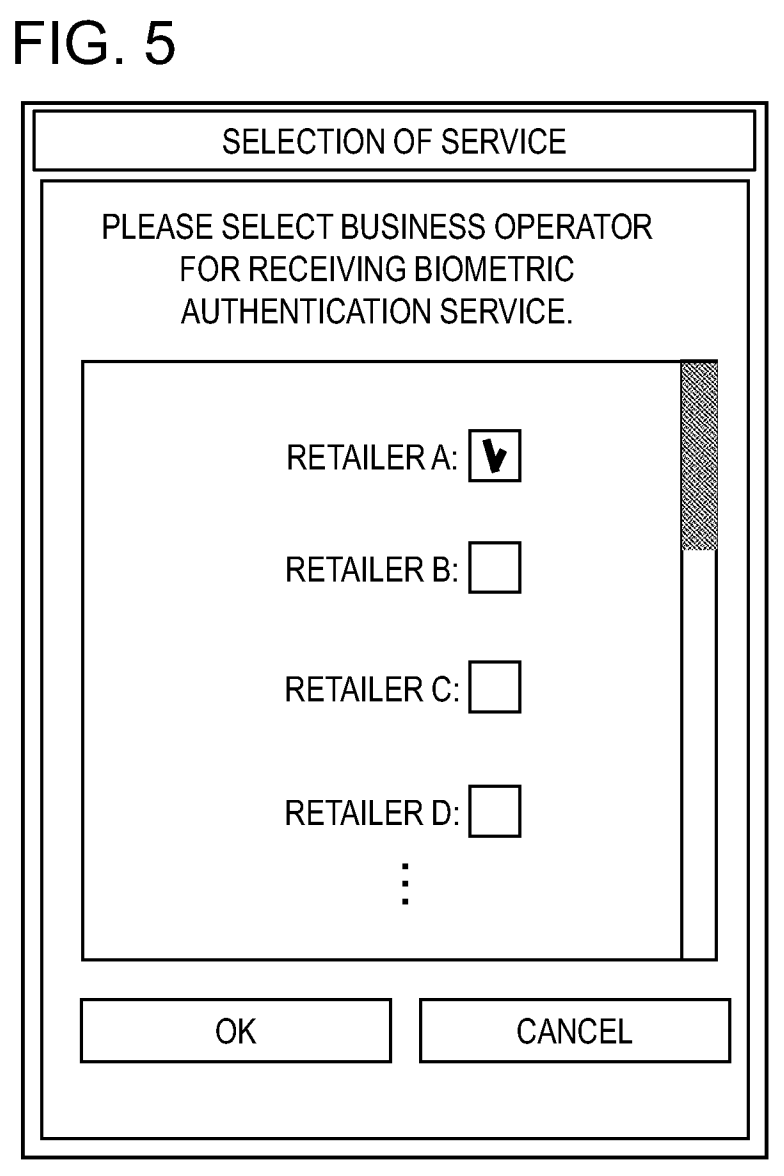

SELECTION OF SERVICE

PLEASE SELECT BUSINESS OPERATOR
FOR RECEIVING BIOMETRIC
AUTHENTICATION SERVICE.

RETAILER A: ▼

RETAILER B: ☐

RETAILER C: ☐

RETAILER D: ☐

· · ·

OK    CANCEL

SELECTION OF SERVICE

DO YOU AGREE TO PROVIDE YOUR
FACE IMAGE TO RETAILER A?

YES

Figure 9:
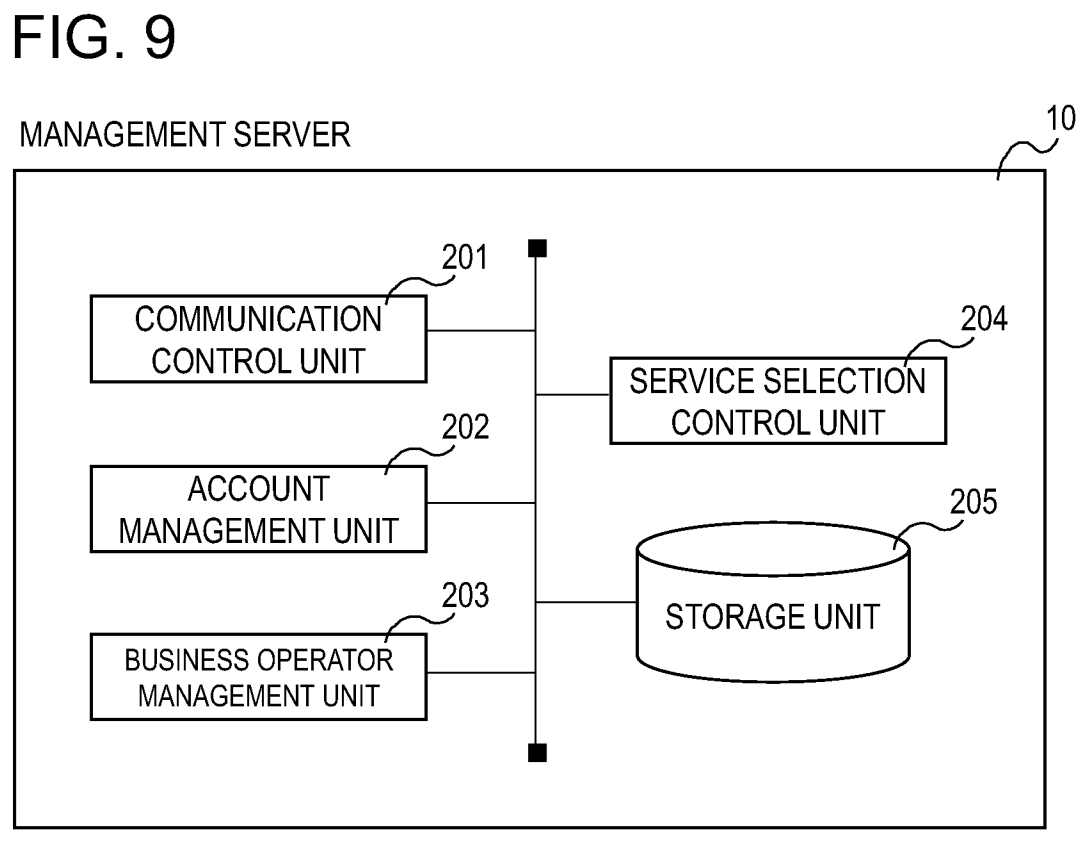

MANAGEMENT SERVER

10

COMMUNICATION CONTROL UNIT  201

ACCOUNT MANAGEMENT UNIT  202

BUSINESS OPERATOR MANAGEMENT UNIT  203

SERVICE SELECTION CONTROL UNIT  204

STORAGE UNIT  205

FIG. 10

ACCOUNT MANAGEMENT DATABASE

| USER ID | LOGIN INFORMATION | NAME | ... | SELECTED SERVICE | ... |
|---------|-------------------|------|-----|------------------|-----|
| uID01 | (ID01,PW01) | NM01 | ... | sID01,sID02,... | ... |
| uID02 | (ID02,PW02) | NM02 | ... | sID03,sID04,... | ... |
| ... | ... | ... | ... | ... | ... |

START

S101 ACQUIRE SELECTED SERVICE

S102 ACQUIRE ORIGINAL BIOMETRIC INFORMATION

S103 TRANSMIT USER REGISTRATION REQUEST

S104 RECEIVE RESPONSE

S105 NOTIFY SUCCESS OR FAILURE OF USER REGISTRATION

END

Figure 12:
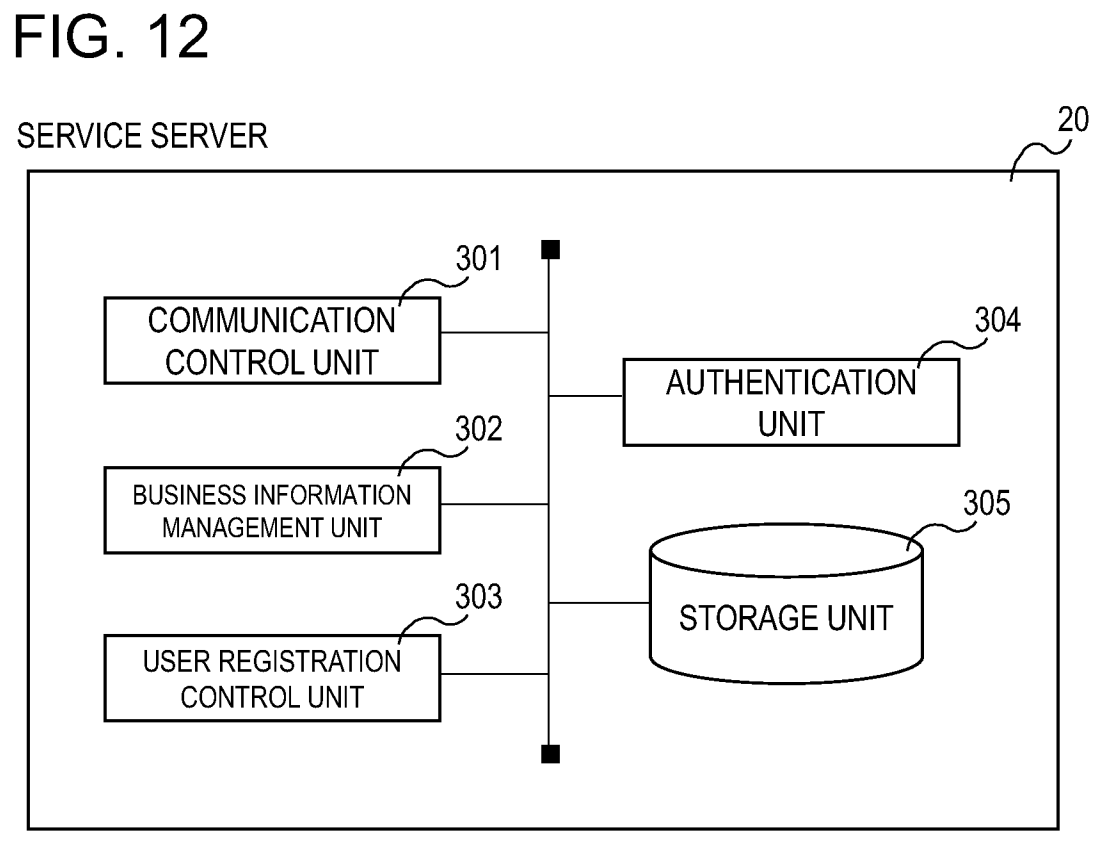

SERVICE SERVER

301 COMMUNICATION CONTROL UNIT

302 BUSINESS INFORMATION MANAGEMENT UNIT

303 USER REGISTRATION CONTROL UNIT

304 AUTHENTICATION UNIT

305 STORAGE UNIT

FIG. 13

USER MANAGEMENT DATABASE

| USER ID | REGISTERED AUTHENTICATION INFORMATION | BUSINESS INFORMATION | ... |
|---------|---------------------------------------|----------------------|-----|
| uID11 | FV11 | GI11 | ⋮ |
| uID12 | FV12 | GI12 | ⋮ |
| ... | ... | ... | ... |

FIG. 14

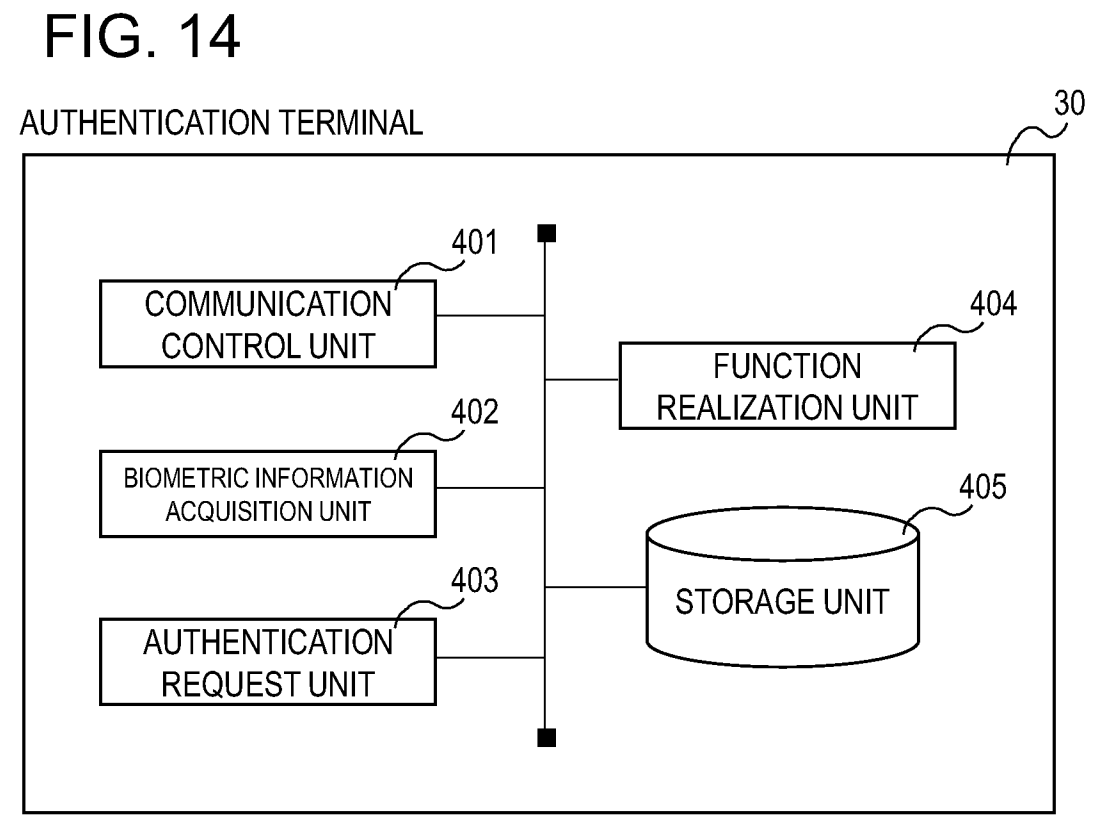

AUTHENTICATION TERMINAL

30

FUNCTION REALIZATION UNIT 404

STORAGE UNIT 405

COMMUNICATION CONTROL UNIT 401

BIOMETRIC INFORMATION ACQUISITION UNIT 402

AUTHENTICATION REQUEST UNIT 403

Figure 15:
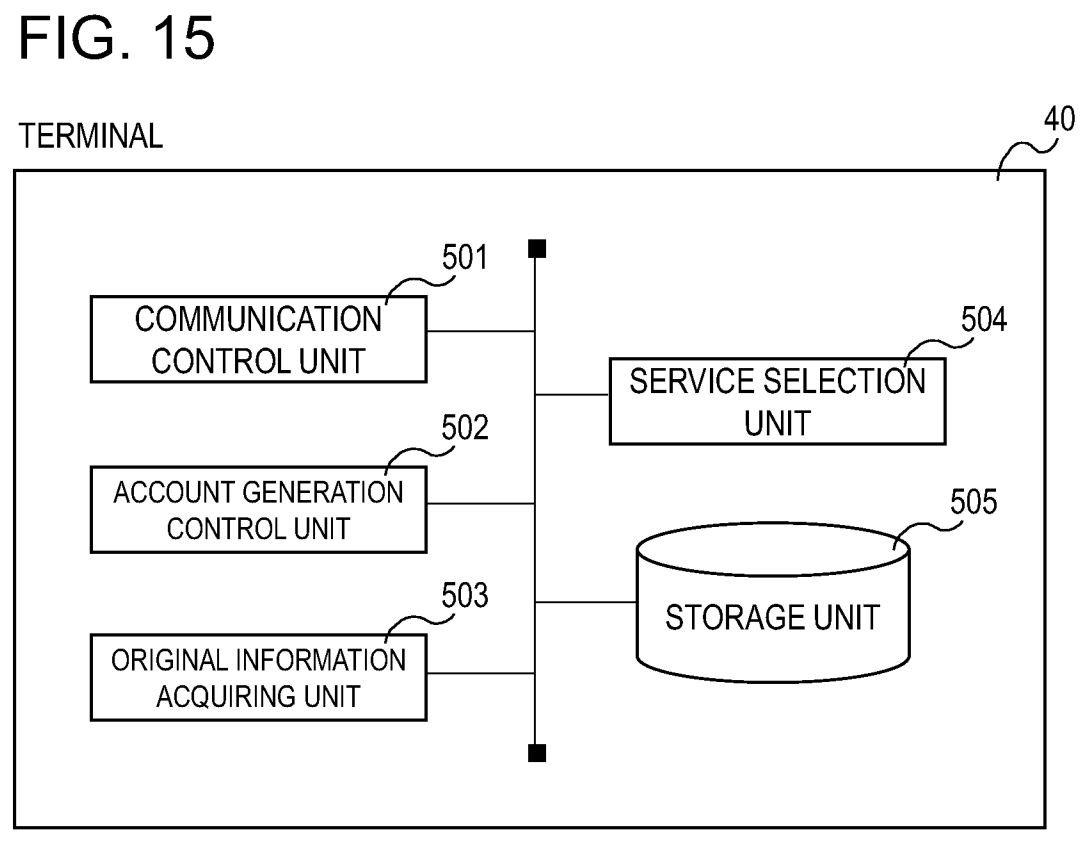

TERMINAL

501 COMMUNICATION CONTROL UNIT

502 ACCOUNT GENERATION CONTROL UNIT

503 ORIGINAL INFORMATION ACQUIRING UNIT

504 SERVICE SELECTION UNIT

505 STORAGE UNIT

SELECTION OF SERVICE

PLEASE PUSH SHUTTER BUTTON TO ACQUIRE FACE IMAGE FOR USING BIOMETRIC AUTHENTICATION SERVICES.

PHOTO

CANCEL

FIG. 18

SELECTION OF SERVICE

DO YOU AGREE TO PROVIDE YOUR FACE IMAGE TO RETAILER A?

YES     NO

PLEASE CHANGE SETTING IF YOU ALLOW RETAILER A TO RETAIN YOUR REGISTERED AUTHENTICATION INFORMATION CONTINUOUSLY.

CONTINUTE TO RETAIN AUTHENTICATION INFORMATION ;

YES     NO

ACQUIRING OF BUSINESS INFORMATION

PLEASE ENTER YOUR CREDIT CARD INFORMATION FOR PAYMENT BY BIOMETRIC AUTHENTICATION.

CREDIT CARD NUMBER

OK

CANCEL

FIG. 20

MANAGEMENT SERVER

10

313 INPUT-OUTPUT INTERFACE

314 COMMUNICATION INTERFACE

311 PROCESSOR

312 MEMORY

FIG. 21

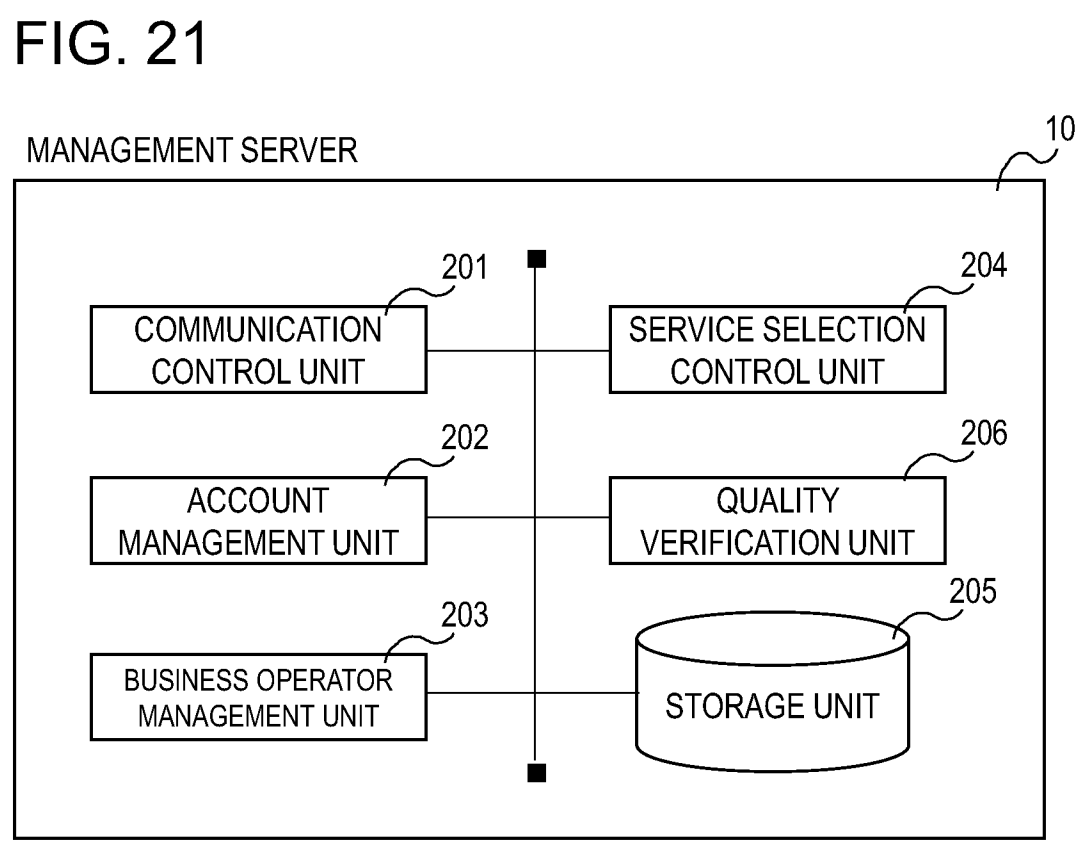

MANAGEMENT SERVER

10

204 SERVICE SELECTION CONTROL UNIT

206 QUALITY VERIFICATION UNIT

205 STORAGE UNIT

201 COMMUNICATION CONTROL UNIT

202 ACCOUNT MANAGEMENT UNIT

203 BUSINESS OPERATOR MANAGEMENT UNIT

FIG. 22

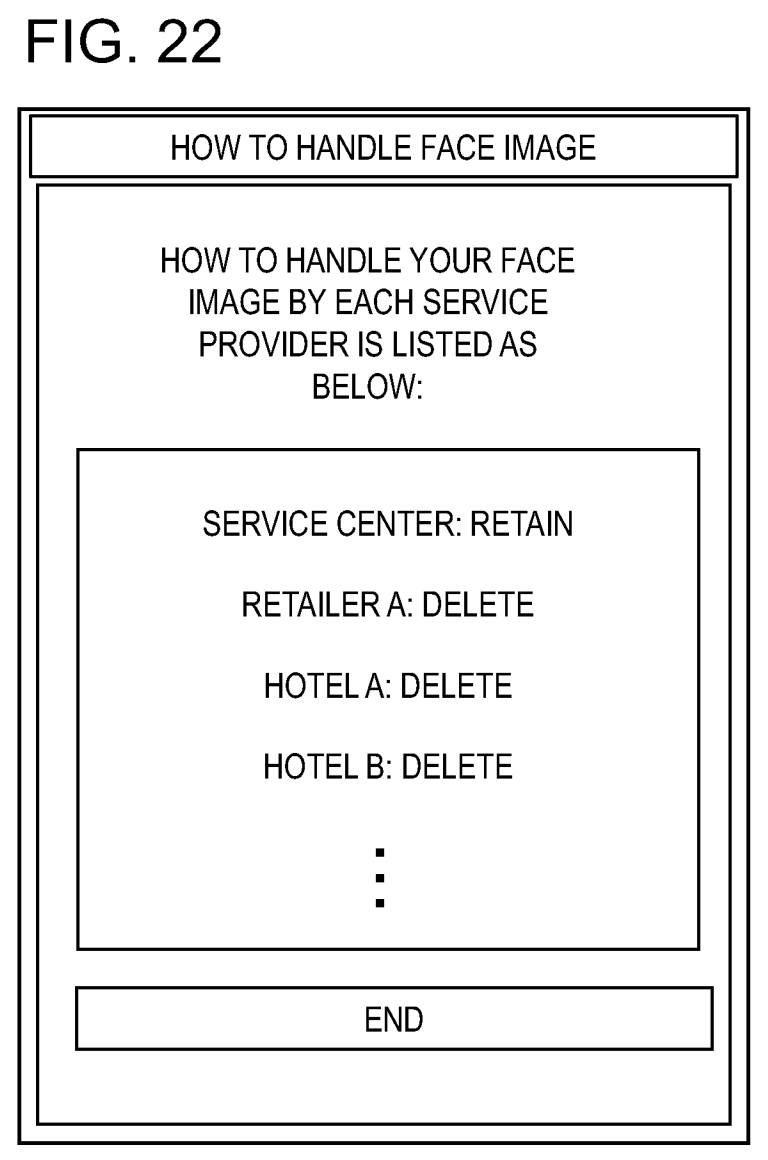

HOW TO HANDLE FACE IMAGE

HOW TO HANDLE YOUR FACE
IMAGE BY EACH SERVICE
PROVIDER IS LISTED AS
BELOW:

SERVICE CENTER: RETAIN

RETAILER A: DELETE

HOTEL A: DELETE

HOTEL B: DELETE

...

END

HOW TO HANDLE FEATURE VALUE

HOW TO HANDLE YOUR FEATURE VALUE BY EACH SERVICE PROVIDER IS LISTED AS BELOW:

AIRLINE A: DELETE IMMEDIATELY

RETAILER A: RETAIN

HOTEL A: RETAIN FOR A WEEK

HOTEL B: RETAIN FOR A WEEK

. . .

END

SYSTEM, TERMINAL, CONTROL METHOD OF TERMINAL, AND STORAGE MEDIUM

This application is a National Stage Entry of PCT/JP2022/025195 filed on Jun. 23, 2022, the contents of all of which are incorporated herein by reference, in their entirety.

TECHNICAL FIELD

The present invention relates to a system, a terminal, a control method of a terminal, and a storage medium.

BACKGROUND ART

Recently, services using biometric authentication are gaining popularity.

PTL 1 describes both security and convenience of electronic payments for purchase of goods and services. A Biometric authentication apparatus described in PTL 1 acquires a CID that identifies a user and a face image. The biometric authentication apparatus downloads a set of face images of a person in a store in advance and authenticates the user by matching these face images with the acquired face image. Upon successful authentication, the biometric authentication apparatus requests a payment apparatus to settle the price of product to be purchased by the user, and when the payment is authorized by the payment apparatus, the purchase of the product is permitted.

CITATION LIST

Patent Literature

[PTL 1] Japanese Unexamined Patent Application Publication No. 2019-067075

SUMMARY OF INVENTION

Technical Problem

As mentioned above, various kinds of services using biometric authentication has started to be provided. In a biometric authentication system, a terminal for biometric authentication is installed in a retail store, and so on, and biometric information is transmitted from the terminal to a server. The server performs matching processing using acquired biometric information and biometric information stored in a database to identify the user.

Users need to register their biometric information (for example, face image) in the server before receiving a service using biometric authentication. In this case, to receive services from each of a plurality of service providers (for example, retailers and transportation business operators), the users need to register their biometric information with each service provider.

Specifically, every time a user wishes to receive a service from a service provider, the user needs to acquire biometric information (for example, face image) by taking a so-called selfie, or the like, and register the acquired biometric information in the server. Such repeated registration work imposes a heavy burden on the user.

It is a main object of the present invention to provide a system, a terminal, a control method of a terminal, and a storage medium that contribute to reducing burden on users who use a plurality of biometric authentication services.

Solution to Problem

According to a first aspect of the present invention, there is provided a system, including: a plurality of first servers operated by each of a plurality of service providers providing services using biometric authentication; a second server that manages biometric authentication of each of the plurality of service providers; and a terminal that stores original biometric information that is an original of authentication information used for biometric authentication, wherein the terminal transmits the original biometric information to the second server in response to a request from the second server, wherein the second server transmits the original biometric information to the first server of the service provider selected by the user from among the plurality of service providers, and wherein the first server generates authentication information for registration from the original biometric information.

According to a second aspect of the present invention, there is provided a terminal, including: a storage unit for storing original biometric information that is an original of authentication information used for biometric authentication; and a transmitting unit for transmitting the original biometric information to a management server, the management server managing biometric authentication for each of a plurality of service providers that provide services using biometric authentication, in response to a request from the management server.

According to a third aspect of the present invention, there is provided a control method of a terminal, the method including: storing original biometric information that is an original of authentication information used for biometric authentication; and transmitting the original biometric information to a management server, the management server managing biometric authentication for each of a plurality of service providers that provide services using biometric authentication, in response to a request from the management server.

According to a fourth aspect of the present invention, there is provided a computer-readable storage medium storing a program causing a computer mounted on a terminal to perform processing for: storing original biometric information that is an original of authentication information used for biometric authentication; and transmitting the original biometric information to a management server, the management server managing biometric authentication for each of a plurality of service providers that provide services using biometric authentication, in response to a request from the management server.

Advantageous Effects of Invention

The individual aspects of the present invention provide a system, a terminal, a control method of a terminal, and a storage medium that contribute to reducing burden on users who use a plurality of biometric authentication services. The advantageous effect of the present invention is not limited to the above advantageous effect. The present invention may provide other advantageous effects, instead of or in addition to the above advantageous effect.

BRIEF DESCRIPTION OF THE DRAWINGS

FIG. 4 is a diagram illustrating an example of an operation in the authentication system according to the first example embodiment.

FIG. 5 is a diagram illustrating an example of a display of a terminal according to the first example embodiment.

FIG. 6 is a diagram illustrating an example of an operation in the authentication system according to the first example embodiment.

FIG. 7 is a diagram illustrating an example of a display of the terminal according to the first example embodiment.

FIG. 9 is a diagram illustrating an example of a processing configuration of a management server according to the first example embodiment.

FIG. 10 is a diagram illustrating an example of an account management database according to the first example embodiment.

FIG. 12 is a diagram illustrating an example of a processing configuration of a service server according to the first example embodiment.

FIG. 13 is a diagram illustrating an example of a user management database according to the first example embodiment.

FIG. 14 is a diagram illustrating an example of a processing configuration of an authentication terminal according to the first example embodiment.

FIG. 15 is a diagram illustrating an example of a processing configuration of a terminal according to the first example embodiment.

FIG. 18 is a diagram illustrating an example of a display of the terminal according to a variation of the first example embodiment.

FIG. 20 is a diagram illustrating an example of a hardware configuration of the management server according to the present application disclosed.

FIG. 21 is a diagram illustrating an example of a schematic configuration of the management server according to a variation in the present application disclosed.

FIG. 22 is a diagram illustrating an example of a display of the terminal according to a variation in the present application disclosed.

EXAMPLE EMBODIMENT

Figure 1:
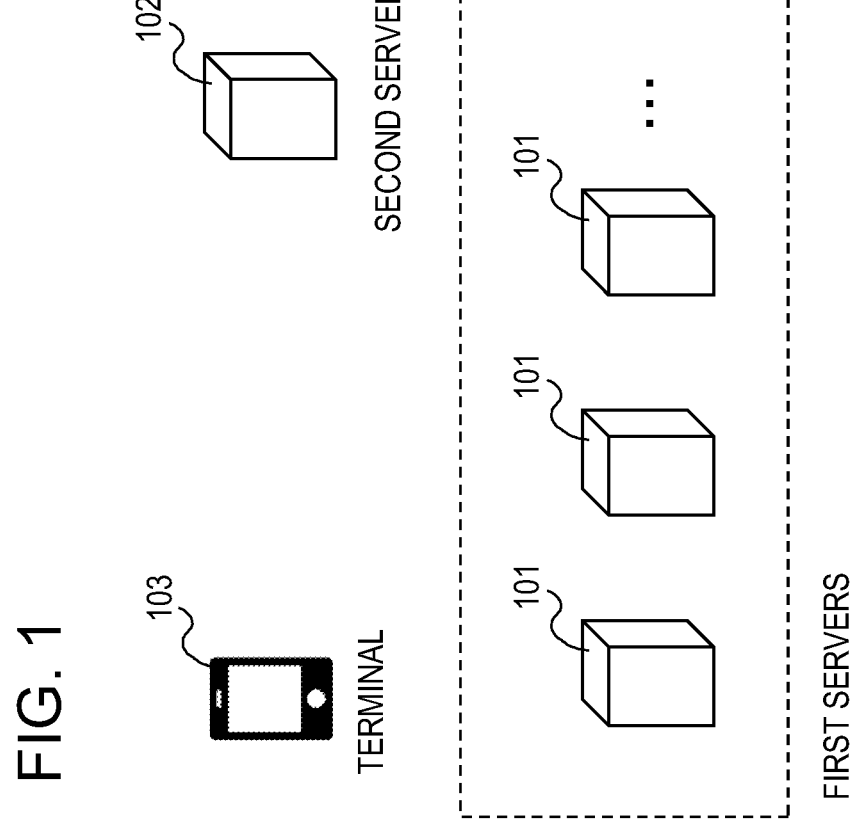
FIG. 1 is a diagram illustrating an outline of an example embodiment.

First, an outline of an example embodiment will be described. In the following outline, various components are denoted by reference characters for the sake of convenience. That is, the following reference characters are used as examples to facilitate the understanding of the present invention. Thus, the description of the outline is not intended to impose any limitations. In addition, unless otherwise specified, an individual block illustrated in the drawings represents a configuration of a functional unit, not a hardware unit. An individual connection line between blocks in the drawings signifies both one-way and two-way directions. An arrow schematically illustrates a principal signal (data) flow and does not exclude bidirectionality. In the present description and drawings, elements that can be described in a like way will be denoted by a like reference character, and redundant description thereof will be omitted as needed.

Figure 2:
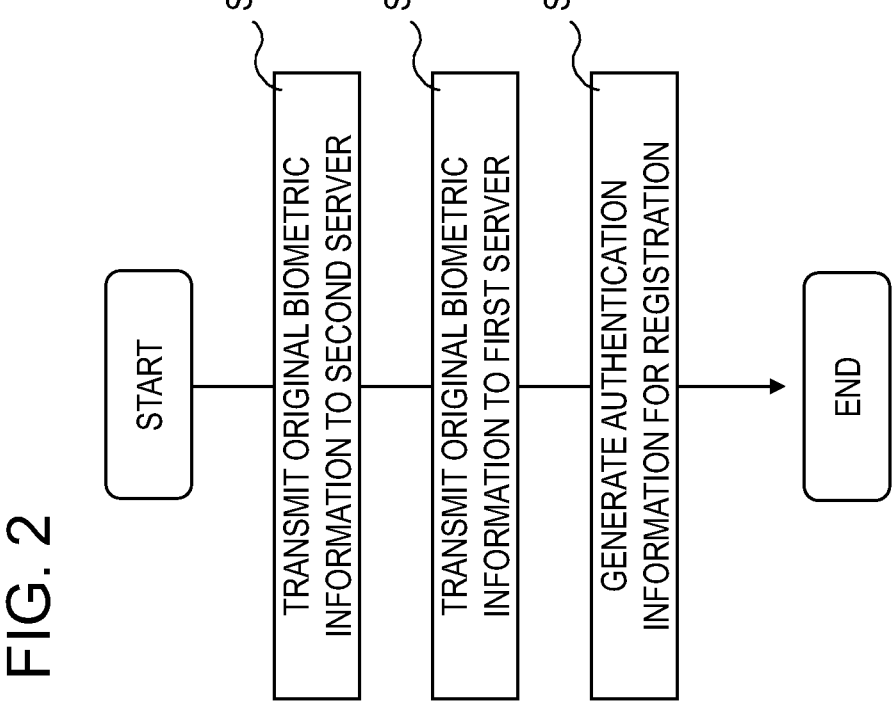
FIG. 2 is a flowchart illustrating an example of an operation according to the example embodiment.

A system according to an example embodiment includes a plurality of first server 101, a second server 102, and a terminal 103 (see FIG. 1). The plurality of first servers 101 are operated by each of a plurality of service providers providing services using biometric authentication. The second server 102 manages biometric authentication of each of the plurality of service providers. The terminal 103 stores original biometric information that is an original of authentication information used for biometric authentication. The terminal 103 transmits the original biometric information to the second server 102 in response to a request from the second server 102 (step S1 in FIG. 2). The second server 102 transmits the original biometric information to the first server 101 of the service provider selected by the user from among the plurality of service providers (step S2). The first server 101 generates authentication information for registration from the original biometric information (step S3).

In the above system, biometric information of a user (original biometric information for authentication information) is stored in the terminal 103 of the user. When the user wishes to receive a biometric authentication service and selects a service provider, the original biometric information is transmitted to the first server 101 of a service provider which needs the original biometric information from the terminal 103 via the second server 102. That is, by registering the original biometric information (for example, face image) in the terminal 103, the user does not need to acquire the original biometric information each time the biometric authentication service is selected (addition of the biometric authentication service). In addition, the original biometric information (for example, face image) is transmitted from the second server 102 to the first server 101, and the first server 101 generates authentication information (feature value). Therefore, it may not be necessary to acquire consent each time the user is authenticated when using the service. As a result, burden on user who uses a plurality of biometric authentication services is reduced.

Hereinafter, a specific example embodiment will be described in more detail with reference to the drawings.

First Example Embodiment

A first example embodiment will be described in more detail with reference to drawings.

System Configuration

Figure 3:
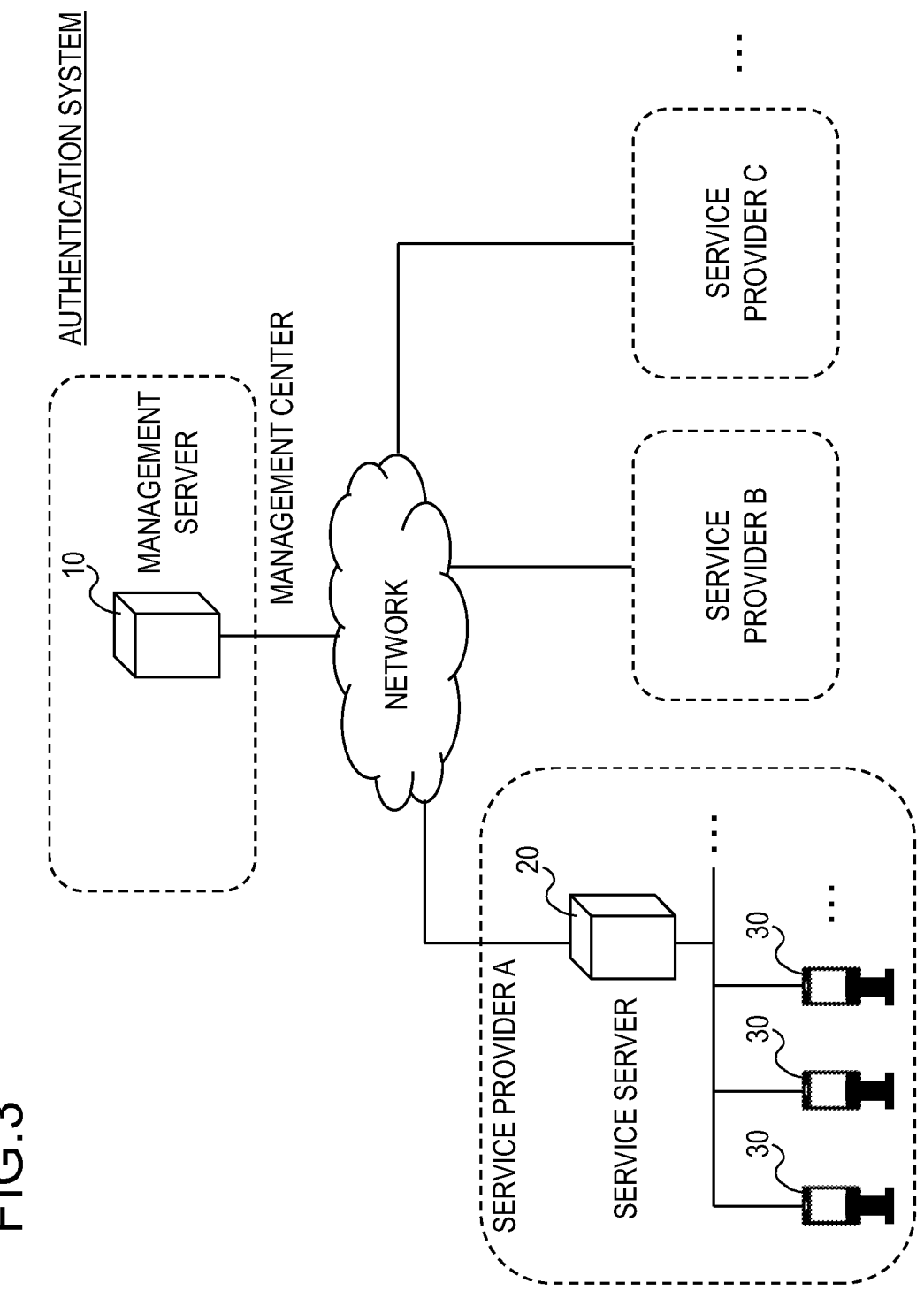
FIG. 3 is a diagram illustrating an example of a schematic configuration of an authentication system according to a first example embodiment.

FIG. 3 is a diagram illustrating an example of a schematic configuration of an authentication system (information processing system) according to a first example embodiment. As illustrated in FIG. 3, the authentication system includes a plurality of service providers A to C and a management center.

The service provider is a business operator that provides a service to a user by using biometric authentication. In an authentication system according to the present application, it is assumed that service providers belonging to various business types or fields provide services by using biometric authentication.

Examples of service providers include business operators of railroads, airplanes, and other means of transportation, accommodation service business operators, retailers, concert and other event business operators, financial service business operators, educational business operators, and employers of users. In addition, service providers are not limited to private business operators such as retail stores. Municipalities and other public agencies may be service providers.

The management center manages biometric authentication for each of the plurality of service providers. Business operators (service providers) that wish to provide services using biometric authentication need to enter into a contract with a company or organization that operates the management center.

The management center includes a management server 10. The management server 10 performs primary functions of the management center. The management server 10 may be a server installed on a building of the management center or may be a server installed on a network (cloud).

As described above, the service provider provides services to users using biometric authentication. For example, the biometric authentication is used to process payments at retail stores. Other examples of services using the biometric authentication include ticket confirmation at event venues, check-in procedures at hotels, attendance management at offices, and emigration and immigration procedures at airports.

As illustrated in FIG. 3, each service provider includes a service server 20 and at least one or more authentication terminals 30. Apparatuses (service server 20 and authentication terminal 30) provided by the service provider are connected to each other for mutual communication. Specifically, the service server 20 and authentication terminal 30 are connected by wired or wireless communication means.

The service server 20 is connected to the management server 10 via a network. The service server 20 may be located in a building of the service provider or in a cloud.

The service server 20 stores information necessary to provide services to users. Specifically, the service server 20 stores business information necessary for each service provider to provide services using biometric authentication and information necessary for biometric authentication. The service server 20 uses a user management database to store business information including name of a user, date of birth, and other information necessary for authentication and the biometric information. Details of the user management database are described below.

For example, a service server 20 of retailer stores account information necessary for payment settlement. A service server 20 of a business operator hosting an event stores ticket information regarding tickets purchased by users. Alternatively, a service server 20 of a transportation business operator stores information regarding commuter pass (for example, an ID to identify the commuter pass) of a user. Alternatively, a service server 20, which manages employee attendance, stores employee's employee number, and other information.

Details of information necessary for biometric authentication stored in the service server 20 will be described later.

The authentication terminal 30 is an apparatus that functions as an interface for users who receive services. The authentication terminals 30 are installed at each service provider's respective service locations. More specifically, the authentication terminals 30 are installed in stores or other locations that users actually visit.

The authentication terminal 30 has functions and forms appropriate to the service provider's type of business and other factors. For example, a tablet-type terminal can be used as the authentication terminal 30 installed at a service provider that provides payment services. Alternatively, the authentication terminal 30 installed at an event site can be a gate apparatus with a gate that restricts passage of users.

The configuration illustrated in FIG. 3 is an example and does not limit the configuration or the like of the authentication system disclosed in the present application. For example, two or more management servers 10 may be installed in the management center. In addition, the service provider may have at least one or more service servers 20 and at least one or more authentication terminals 30.

Outline of Operation

Figure 4:
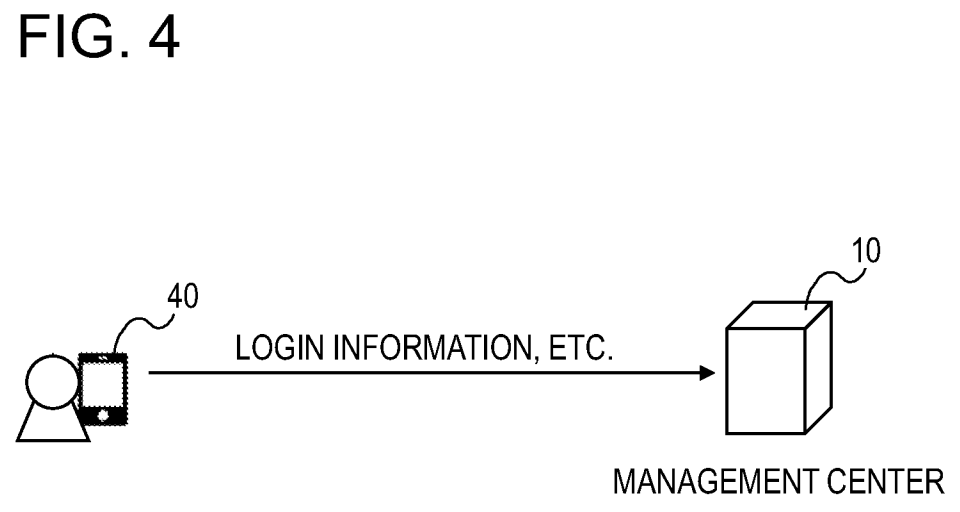

Next, a schematic operation in the authentication system according to the first example embodiment will be described.
<Account Generation>
Users who wish to receive services from service providers included in the authentication system need to generate an account in the system. Specifically, a user accesses a management server 10 by operating a terminal 40 in his/her possession (see FIG. 4).

The user enters login information (for example, login ID, password), name, date of birth, and the like on a web page provided by the management server 10. When the management server 10 acquires login information, and the like, the management server 10 generates a user ID to identify the user in question. The management server 10 stores the generated user ID, login information, and the like in an account management database in correspondence. Details of the account management database are described below.
<Registration of Biometric Information>
Users who wish to receive services using biometric authentication need to register their biometric information with terminals 40.

Here, pre-registration of authentication information generated from biometric information is required to perform biometric authentication. For example, when performing face authentication, feature value (feature vector) generated from a face image need to be pre-registered as the authentication information. Alternatively, feature value generated from a fingerprint image need to be pre-registered as the authentication information when fingerprint authentication is performed.

In the following descriptions, information that serves as an original (basis) for generating authentication information, such as face images and fingerprint images, will be referred to as "original biometric information". A feature value that are generated from the original biometric information and pre-registered will be referred to "registered authentication information".

Users who have completed user registration need to register their original biometric information (for example, face image) with the terminal 40 in their possession. The terminal 40 acquires the original biometric information using a graphical user interface (GUI) or other means. The terminal 40 stores the acquired original biometric information (for example, face image) internally. Thus, the terminal 40 stores the original biometric information, which is original authentication information used for biometric authentication.

<Service Selection>

Users who have completed system registration (account generation) and registered original biometric information select a service provider to receive biometric authentication services at a portal site provided by the management server 10.

Here, the management server 10 stores information on service providers participating in the authentication system. For example, the management server 10 stores name, type of business, location, and so on of the service provider. The management server 10 maintains information on each of the plurality of service providers and allows a user to select a service provider.

When the user operates the terminal 40 and performs a predetermined action on the portal site, the management server 10 displays a GUI, and the like on the terminal 40. The GUI allows the user to select a service (service provider) desired.

For example, the management server 10 uses a GUI shown in FIG. 5 to acquire the service (biometric authentication service) desired by the user.

<User Registration>

After acquiring a service provider selected by a user, the management server 10 requests the terminal 40 to provide original biometric information. Specifically, the management server 10 transmits an original providing request to the terminal 40 (see FIG. 6, step S01).

Upon receiving the original providing request, the terminal 40 acquires consent to provide the original biometric information (for example, face image) of the user to the service provider. For example, the terminal 40 uses a GUI shown in FIG. 7 to acquire the consent (opt-in) of the user to provide the original biometric information (for example, face image). That is, consent by the user is prior consent (opt-in) to provide his/her original biometric information (for example, face image) to a business operator providing the desired service when applying for the desired service.

Figure 6:
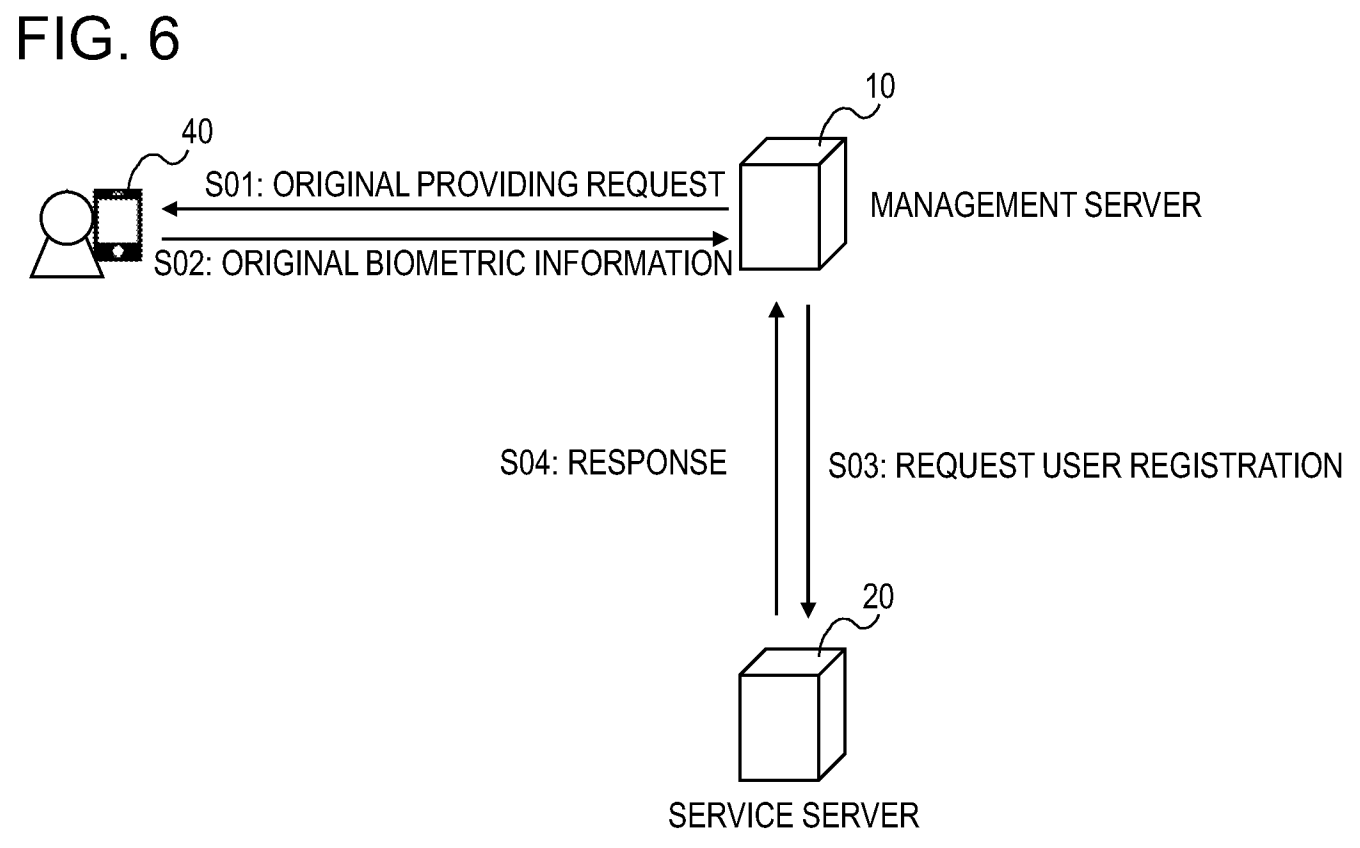

When the consent of the user is acquired, the terminal 40 transmits the original biometric information (for example, face image) of the user to the management server 10 (FIG. 6, step S02).

The management server 10 notifies a service provider corresponding to a service selected by a user of original biometric information, individual identification information, and so on acquired. The individual identification information is information for identifying the user. Examples of the individual identification information include name of the user or a combination of name and date of birth.

The management server 10 transmits a "user registration request" including the original biometric information and the individual identification information to the service server 20 of the service provider selected by the user (step S03).

In this way, the user provides the original biometric information (master data of biometric information) stored in the terminal 40, such as a smartphone, to the service provider via the management server 10 of the management center. At that time, the terminal 40 continues to retain the original biometric information (master data) of the user internally.

The management server 10 deletes the original biometric information (for example, face image) at a timing of transmitting the user registration request to the service server 20 or at a timing of receiving a response to the request.

Upon receiving the user registration request, the service server 20 identifies a user who wishes to receive a biometric authentication service. The service server 20 searches the user management database using the acquired individual identification information (for example, name) as a key to identify the corresponding entry (user).

Once the user is identified, the service server 20 generates the registered authentication information from the acquired original biometric information. For example, when the service server 20 acquires a face image as the original biometric information, the service server 20 generates feature value (feature vector) corresponding to a face authentication algorithm adopted by the company as the registered authentication information.

In this way, the service server 20 of each service provider calculates the registered authentication information from the original biometric information (for example, face image) of the user using the face authentication algorithm (face authentication engine, face authentication program) adopted by each service provider.

Once the registered authentication information is generated, the service server 20 stores the generated registered authentication information (for example, feature value) in the user management database.

When the service server 20 generates the registered authentication information (for example, feature value), the service server 20 deletes the acquired original biometric information from the management server 10.

When the user registration is successfully completed, the service server 20 transmits an acknowledgement to that effect to the management server 10 (step S04).

In this way, the authentication system includes the plurality of service servers 20 (first servers), each operated by the plurality of service providers, which provide services using biometric authentication. In addition, the authentication system includes the management server 10 (second server) that manages biometric authentication for each of the plurality of service providers. The terminal 40 owned by a user transmits the original biometric information to the management server 10 in response to a request from the management server 10. The management server 10 transmits the acquired original biometric information to the service server 20 of the service provider selected by the user from among the plurality of service providers. The service server 20 generates authentication information for registration (the registered authentication information) from the original biometric information.

<Service Provision>

After completing the selection of service, a user visits a service provider to receive service. For example, the user visits a retail store, an event venue, or any other facility or store that provides a service of the selection of the user.

Figure 8:
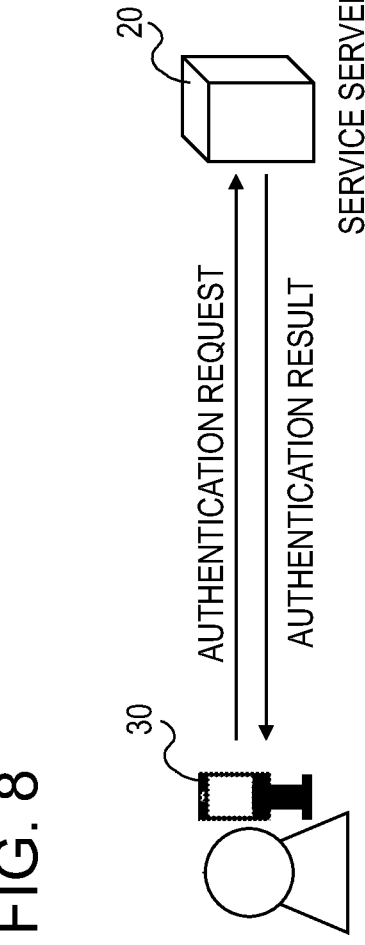
FIG. 8 is a diagram illustrating an example of an operation in the authentication system according to the first example embodiment.

The authentication terminal 30 acquires the biometric information of a user (a person to be authenticated) to whom the service is provided. For example, the authentication terminal 30 takes a picture of the person to be authenticated and acquires biometric information (face image) corresponding to the original biometric information. The authentication terminal 30 transmits an authentication request including the acquired face image to the service server 20 (see FIG. 8). The authentication terminal 30 transmits other information (for example, payment information such as a price for purchased products) together with the biometric information to the service server 20, if necessary.

The service server 20 generates the authentication information for matching from the acquired face image. For example, the service server 20 generates feature value for matching from the face image. The service server 20 performs a matching process (1-to-N matching; N is a positive integer, the same applies hereinafter) using the generated authentication information for matching (hereinafter referred to as "matching authentication information") and registered authentication information registered in the user management database.

The service server 20 identifies a user (a person to be authenticated) registered in the user management database by the matching process.

The service server 20 authenticates the user using business information of the identified user. For example, the service server 20 determines "authentication success" when a payment is successfully settled using an account information of the identified user. Alternatively, the service server 20 determines "authentication success" when a ticket associated with the identified user is valid.

The service server 20 transmits an authentication result (authentication success, authentication failure) to the authentication terminal 30.

The authentication terminal 30 executes a process according to the result of authentication. For example, upon receiving a successful authentication, the authentication terminal 30 installed in a retail store notifies the person to be authenticated that payment for goods has been completed. Alternatively, upon receiving a successful authentication, the authentication terminal 30 installed at an event site allows the person to be authenticated to pass through a gate.

In this way, an authentication terminal 30, the authentication terminal 30 being installed at a service providing place visited by a person to be authenticated among the plurality of authentication terminals 30 included in the authentication system, transmits the authentication request including the biometric information of the person to be authenticated to the service server 20. The service server 20 corresponds to the service providing place visited by the person to be authenticated. Upon receiving the authentication request, the service server 20 generates the matching authentication information from the biometric information included in the authentication request. The service server 20 performs authentication processing using the generated matching authentication information and the registered authentication information. More specifically, the service server 20 that receives the authentication request determines that the authentication is successful when the business information of the person to be authenticated identified by the matching process using the authentication information for registration and the authentication information for matching is valid.

Next, details of the individual apparatuses included in the authentication system according to the first example embodiment will be described.

[Management Server]

FIG. 9 is a diagram illustrating an example of a processing configuration (processing modules) of a management server 10 according to the first example embodiment. As illustrated in FIG. 9, the management server 10 includes a communication control unit 201, an account management unit 202, a business operator management unit 203, a service selection control unit 204, and a storage unit 205.

The communication control unit 201 is means for controlling communication with other apparatuses. Specifically, the communication control unit 201 receives data (packets) from the service server 20. In addition, the communication control unit 201 transmits data to the service server 20. The communication control unit 201 gives data received from other apparatuses to other processing modules. The communication control unit 201 transmits data acquired from other processing modules to other apparatuses. In this way, other processing modules transmit and receive data to and from other apparatuses via the communication control unit

201. The communication control unit 201 has a function as a receiving unit to receive data from other apparatuses and as a transmitting unit to transmit data toward other apparatuses.

The account management unit 202 is means for managing user accounts. The account management unit 202 acquires information necessary to generate an account of a user when the user operates the terminal 40 to access a predetermined home page or the like.

Specifically, the account management unit 202 acquires personal information such as login information, name, date of birth, and so on. After acquiring the login information and so on, the account management unit 202 generates a user ID for identifying a user. The user ID may be any information as long as it can uniquely identify the user. For example, the account management unit 202 may number a unique value each time an account is created and use the unique value as the user ID.

The account management unit 202 associates the generated user ID, login information, name, and so on, and stores them in an account management database (see FIG. 10). The configuration illustrated in FIG. 10 is an example, and is not meant to limit items to be stored. For example, the account creation date and time may be stored in the account management database.

The account management unit 202 acquires the login information from the terminal 40 of the user to log into a predetermined portal site. The account management unit 202 performs authentication using the login information.

The business operator management unit 203 is means for managing service providers (business operator) participating in the authentication system. The business operator management unit 203 acquires business operator information to be registered in the system (name of service provider, type of business, location, service server 20 address, and so on) from a staff, or the like of each service provider.

For example, the business operator management unit 203 may provide each service provider with an interface for entering the business operator information and other information. Alternatively, each service provider may send a USB (Universal Serial Bus) memory, or the like, containing the business operator information, and so on, to the management center. The business operator management unit 203 may acquire the business operator information and other information from a staff of the management center.

The business operator management unit 203 generates an ID (business operator ID) for a service provider that has acquired business operator information and the like. The business operator management unit 203 associates and stores the generated business operator ID, the acquired business operator information, and so on.

The service selection control unit 204 is means for controlling selection of a biometric authentication service (service provider) by a user.

When the user operates the terminal 40 to log in to a portal site and perform a predetermined operation on the portal site, the service selection control unit 204 displays a GUI or the like on the terminal 40. The GUI allows the user to select a desired service. For example, the service selection control unit 204 displays a GUI as illustrated in FIG. 5 on the terminal 40.

The service selection control unit 204 uses the business operator information acquired by the business operator management unit 203 to display the GUI such as that shown in FIG. 5. The service selection control unit 204 refers to the business operator information and displays on the terminal

40 information of service providers (a list of service providers) that have concluded contracts with the management center.

When providing information on service providers to a user, the service selection control unit 204 may provide the user with more detailed information on each service provider (for example, business type, service provided, store location, and so on).

After acquiring the service provider selected by the user, the service selection control unit 204 transmits an "original providing request" to the terminal 40 in a possession of the user. The service selection control unit 204 receives the original biometric information of the user (for example, face image) from the terminal 40.

The service selection control unit 204 transmits a user registration request including the user ID of a user, the acquired original biometric information, the individual identification information, and so on to the service server 20 of the service provider corresponding to the service selected by the user.

The service selection control unit 204 receives a response (positive response, negative response) to the user registration request.

When a positive response (successful user registration) is received, the service selection control unit 204 registers the business operator ID of the service provider selected by the user in the account management database. That is, the service selection control unit 204 reflects the service selection of the user in the account management database. When the positive response is received, the service selection control unit 204 notifies the user that the user registration has been successful.

When a negative response (failure user registration) is received, the service selection control unit 204 notifies the user to that effect.

The storage unit 205 is means for storing information necessary for operations of the management server 10.

Figure 11:
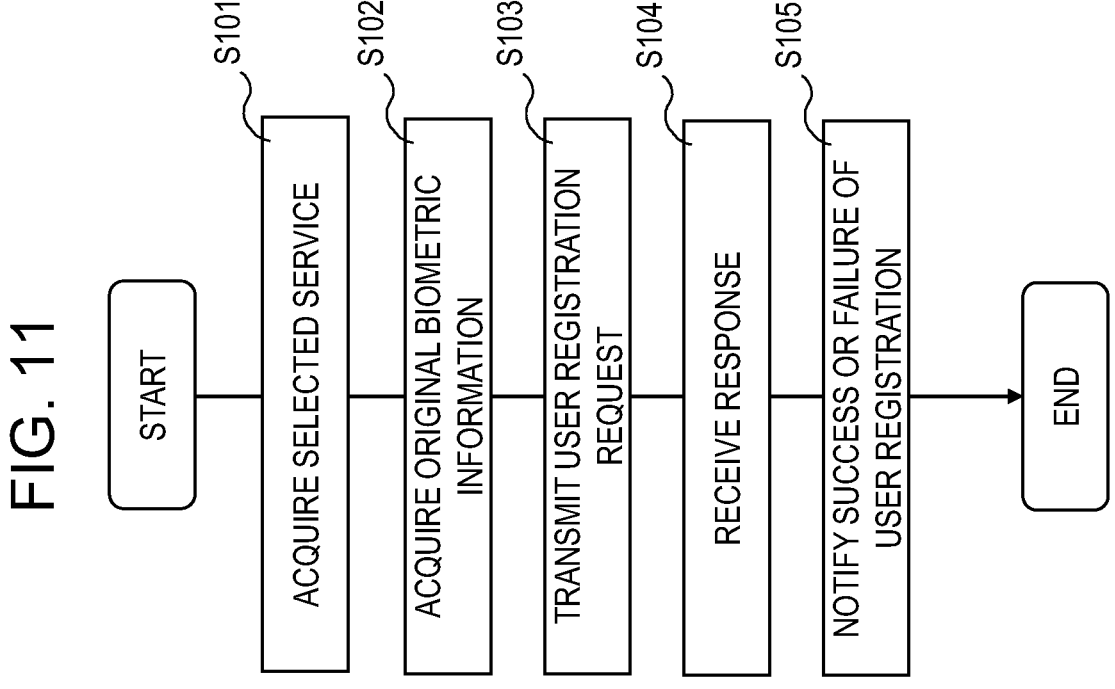
FIG. 11 is a flowchart illustrating an example of an operation of a management server according to the first example embodiment.

A flowchart in FIG. 11 summarizes operations of the management server 10 described above regarding user registration.

The management server 10 acquires a biometric authentication service (service provider) that a user wishes to be provided (acquire a selected service; step S101).

The management server 10 acquires original biometric information by transmitting an "original providing request" to the terminal 40 owned by the user (step S102). At that time, consent of the user (consent for the original biometric information to be provided to the service provider) is acquired by the terminal 40.

The management server 10 transmits a user registration request including the acquired original biometric information (for example, face image) and individual identification information (for example, name) to the service server 20 (step S103).

The management server 10 receives a response to the user registration request from the service server 20 (step S104).

The management server 10 notifies the user of a success or failure of the user registration (step S105).

[Service Server]

FIG. 12 is a diagram illustrating an example of a processing configuration (processing modules) of a service server 20 according to the first example embodiment. As illustrated in FIG. 12, the service server 20 includes a communication control unit 301, a business information management unit 302, a user registration control unit 303, an authentication unit 304, and a storage unit 305.

The communication control unit 301 is means for controlling communication with other apparatuses. Specifically, the communication control unit 301 receives data (packets) from the management server 10. In addition, the communication control unit 301 transmits data to the management server 10. The communication control unit 301 gives data received from other apparatuses to other processing modules. The communication control unit 301 transmits data acquired from other processing modules to other apparatuses. In this way, other processing modules transmit and receive data to and from other apparatuses via the communication control unit 301. The communication control unit 301 has a function as a receiving unit to receive data from other apparatuses and as a transmitting unit to transmit data toward other apparatuses.

The business information management unit 302 is means for managing and controlling business information necessary for a service provider to provide business.

The business information management unit 302 acquires the business information necessary to provide own service by any means. For example, the business information management unit 302 acquires information specific to its own service providing, in addition to name of a user, date of birth, and other information. For example, the business information management unit 302 of a retailer acquires account information such as credit card information and bank account. The business information management unit 302 of an event business operator acquires information on a ticket purchased by a user (ticket number, event date, event location, and so on).

The business information management unit 302 may acquire the above business information from a staff of the service provider, and so on, or directly from a user using a website or other means. That is, the user may operate the terminal 40 to individually access the service server 20 of each service provider. The user may register in the service server 20 the business information necessary for providing the service. In addition, the business information management unit 302 acquires information required for service providing according to the service providing season. For example, when an infectious disease is prevalent, the business information management unit 302 may acquire a vaccination certificate, negative certificate, or the like regarding the infectious disease as the business information.

The business information management unit 302 manages the acquired business information using a user management database.

A more detailed description of the business information management unit 302 will be omitted. This is because the details of business information in individual services and the method of acquiring such information are different from a purpose of the present application.

The user registration control unit 303 is means for controlling registration of users to be provided with the biometric authentication services by the service providers. The user registration control unit 303 processes a user registration request received from the management server 10.

Upon receiving the user registration request, the user registration control unit 303 searches the user management database using the individual identification information (for example, name) included in the user registration request as a key, and identifying the corresponding user (entry).

If the corresponding user is registered in the user management database, the user registration control unit 303 generates registered authentication information from the acquired original biometric information (for example, face image). For example, when a face image is acquired, the user registration control unit 303 generates a feature value (feature vector) corresponding to the face authentication algorithm adopted by the company as the registered authentication information.

An existing technique can be used to generate the feature value, and therefore, detailed description thereof will be omitted. For example, the user registration control unit 303 extracts eyes, nose, mouth, and so on from a face image as feature points. Next, the user registration control unit 303 calculates a location of an individual feature point and a distance between feature points as feature value. The user registration control unit 303 generates a feature vector formed by the plurality of feature values (vector information that characterizes the face image).

Once the registered authentication information (for example, feature value) is generated, the user registration control unit 303 associates and stores the user ID, the generated registered authentication information (feature value), and the business information in the user management database (see FIG. 13).

Note that the user management database shown in FIG. 13 is an example, and is not meant to limit the items to be stored. For example, the date and time of user registration may be registered in the user management database. In addition, the user IDs shown in FIG. 13 are IDs generated by the management server 10. The business information management unit 302 may generate its own IDs to manage its own users and store the generated IDs in the user management database.

When the user registration is successfully completed, the user registration control unit 303 transmits a positive response indicating that the user registration has been successful to the management server 10.

When the user registration is not completed successfully, the user registration control unit 303 transmits a negative response indicting that the user registration has been a failure to the management server 10. For example, the negative response is transmitted to the management server 10 when the individual identification information (for example, name) received from the management server 10 is not registered in the user management database or when valid registered authentication information cannot be generated from the original biometric information.

The authentication unit 304 is means for performing a biometric authentication of a person to be authenticated. The authentication unit 304 receives an authentication request from the authentication terminal 30. The authentication unit 304 retrieves the biometric information (for example, face image) from the authentication request.

The authentication unit 304 generates matching authentication information from the acquired biometric information. For example, upon acquiring a face image, the authentication unit 304 generates feature value corresponding to a face authentication algorithm employed by the company. The authentication unit 304 executes a matching process using the generated matching authentication information (feature value) and the registered authentication information (feature value) in the user management database.

Specifically, the authentication unit 304 calculates a similarity between the feature value (feature vector) as the matching target and each of the plurality of feature values registered. For the individual similarity, the chi-squared distance, the Euclidean distance, or the like may be used. A longer distance represents a lower similarity, and a shorter distance represents a higher similarity.

If there are no feature value whose similarity is greater than a predetermined value, the authentication unit 304 sets an authentication result to "authentication failure".

If there is feature value whose similarity is greater than a predetermined value, the authentication unit 304 identifies the entry (user) with the most similar feature value (registered authentication information) among the plurality of entries registered in the user management database. The authentication unit 304 authenticates the person to be authenticated using the business information of the identified user.

For example, the authentication unit 304 of a retailer determines "authentication success" when payment for products is successful using payment information acquired from the authentication terminal 30 and the account information registered in the user management database. On the other hand, the authentication unit 304 determines "authentication failure" when the payment for products is a failure.

Alternatively, if ticket information of a person to be authenticated registered in the user management database is valid, the authentication unit 304 of an event business operator determines "authentication success". On the other hand, if the ticket information of the person to be authenticated registered in the user management database is invalid, the authentication unit 304 determines "authentication failure".

A more detailed description of authentication processing using business information in each service provider will be omitted. This is because the processing specific to each service provider is different from the purpose of the present application.

The authentication unit 304 transmits an authentication result (authentication success, authentication failure) to the authentication terminal 30.

The storage unit 305 is means for storing information necessary for the operation of the service server 20.

[Authentication Terminal]

FIG. 14 is a diagram illustrating an example of a processing configuration (processing modules) of an authentication terminal 30 according to the first example embodiment. As illustrated in FIG. 14, the authentication terminal 30 includes a communication control unit 401, a biometric information acquisition unit 402, an authentication request unit 403, a function realization unit 404, and a storage unit 405.

The communication control unit 401 is means for controlling communication with other apparatuses. Specifically, the communication control unit 401 receives data (packets) from the service server 20. In addition, the communication control unit 401 transmits data to the service server 20. The communication control unit 401 gives data received from other apparatuses to other processing modules. The communication control unit 401 transmits data acquired from other processing modules to other apparatuses. In this way, other processing modules transmit and receive data to and from other apparatuses via the communication control unit 401. The communication control unit 401 has a function as a receiving unit to receive data from other apparatuses and as a transmitting unit to transmit data toward other apparatuses.

The biometric information acquisition unit 402 controls a camera and acquires biometric information (for example, face image) of a person to be authenticated. The biometric information acquisition unit 402 takes images of the front of the apparatus periodically or at predetermined times. The biometric information acquisition unit 402 determines whether the acquired image includes a human face image, and if the human face image is included, extracts the face image from the acquired image data.

An existing technique can be used for the face image detection and extraction processing performed by the biometric information acquisition unit 402, and therefore, detailed description thereof will be omitted. For example, the biometric information acquisition unit 402 may extract a face image (a face area) from the image data by using a learning model learned by a CNN (Convolutional Neural Network). Alternatively, the biometric information acquisition unit 402 may extract a face image by using a technique such as template matching.

The biometric information acquisition unit 402 gives the extracted face image to the authentication request unit 403.

The authentication request unit 403 is means for requesting the service server 20 to perform an authentication of a person to be authenticated. When authentication of the person to be authenticated becomes necessary, the authentication request unit 403 transmits an authentication request including the biometric information of the person to be authenticated (the user in front of the authentication terminal 30) to the service server 20.

The authentication request unit 403 receives an authentication result (authentication success, authentication failure) from the service server 20. The authentication request unit 403 gives the received authentication result to the function realization unit 404.

The function realization unit 404 is means for realizing a function given to the authentication terminal 30. For example, the function realization unit 404 of the authentication terminal 30 installed at a retailer notifies a person to be authenticated that a payment has been completed upon receiving the authentication success. Alternatively, the function realization unit 404 of the authentication terminal 30 installed at an event venue opens a gate and allows the person to be authenticated to enter upon receiving the authentication success.

A more detailed description of the function realization unit 404 included in the authentication terminal 30 of each service provider will be omitted. This is because function realization of the authentication terminal 30 by the function realization unit 404 is different from the purpose of the present application.

The storage unit 405 is means for storing information necessary for operations of the authentication terminal 30.

[Terminal]

FIG. 15 is a diagram illustrating an example of a processing configuration (processing modules) of the terminal 40 according to the first example embodiment. As illustrated in FIG. 15, the terminal 40 includes a communication control unit 501, an account generation control unit 502, an original information acquiring unit 503, a service selection unit 504, and a storage unit 505.

The communication control unit 501 is means for controlling communication with other apparatuses. Specifically, the communication control unit 501 receives data (packets) from the management server 10. In addition, the communication control unit 501 transmits data to the management server 10. The communication control unit 501 gives data received from other apparatuses to other processing modules. The communication control unit 501 transmits data acquired from other processing modules to other apparatuses. In this way, other processing modules transmit and receive data to and from other apparatuses via the communication control unit 501. The communication control unit

501 has a function as a receiving unit to receive data from other apparatuses and as a transmitting unit to transmit data toward other apparatuses.

The account generation control unit 502 is means for controlling an account generation by a user. The account generation control unit 502 accesses a predetermined web page, or the like provided by the management server 10 in response to an operation of the user.

The account generation control unit 502 enters login information, name, date of birth, and so on, on the web page in response to the operation of the user.

Figure 16:
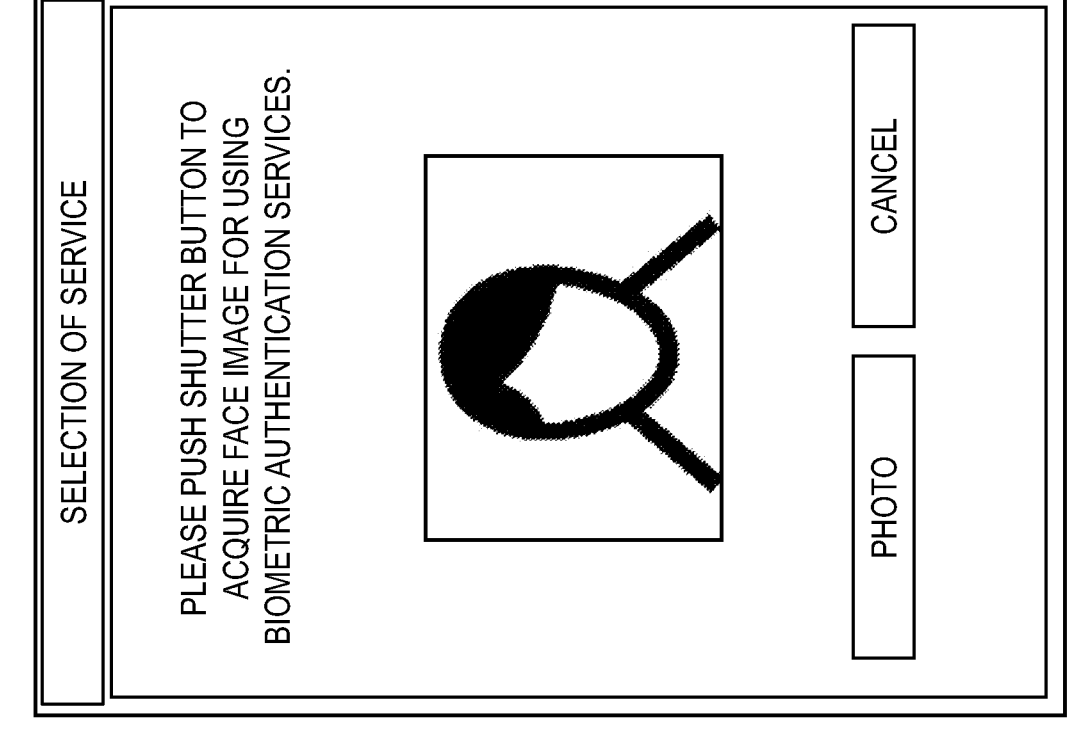
FIG. 16 is a diagram illustrating an example of a display of the terminal according to the first example embodiment.

The original information acquiring unit 503 is means for acquiring the biometric information (original biometric information) of a user. The original information acquiring unit 503 displays a GUI, or the like for acquiring the original biometric information (for example, face image) in response to an operation of the user. For example, the original information acquiring unit 503 uses a GUI such as that shown in FIG. 16 to acquire the original biometric information.

The original information acquiring unit 503 stores the acquired original biometric information (for example, face image) in the storage unit 505. At this time, the original information acquiring unit 503 may encrypt, code, or the like the acquired original biometric information, and store the encrypted original biometric information in the storage unit 505. That is, the terminal 40 owned by a user may hold the encrypted original biometric information. The encrypted original biometric information may be decrypted when the original biometric information is transmitted to the management server 10. Alternatively, information (for example, a common key) for decrypting the encrypted original biometric information may be shared between the terminal 40 and the management server 10. The management server 10 may decrypt the encrypted original biometric information.

In principle, the terminal 40 does not delete (not discard) the original biometric information (for example, face image) of a user. That is, the terminal 40 does not delete the original biometric information stored in storage unit 505 without explicit instructions from the user.

The service selection unit 504 is means for enabling a user to select a biometric authentication service. The service selection unit 504 logs into a portal site provided by the management server 10 in response to an operation of a user. The service selection unit 504 transmits information of a service provider selected by the user to the management server 10 using the GUI provided by the management server 10.

The service selection unit 504 receives an original providing request from the management server 10. Upon receiving the request, the service selection unit 504 acquires a consent of a user to provide the original biometric information (for example, face image) stored inside the apparatus to the service provider. For example, the service selection unit 504 acquires whether or not the original biometric information (for example, face image) can be provided using a GUI as shown in FIG. 7.

The service selection unit 504 transmits the original biometric information to the management server 10 when the consent of the user is acquired.

The storage unit 505 is means for storing information necessary for the operation of the terminal 40.

System Operation

Figure 17:
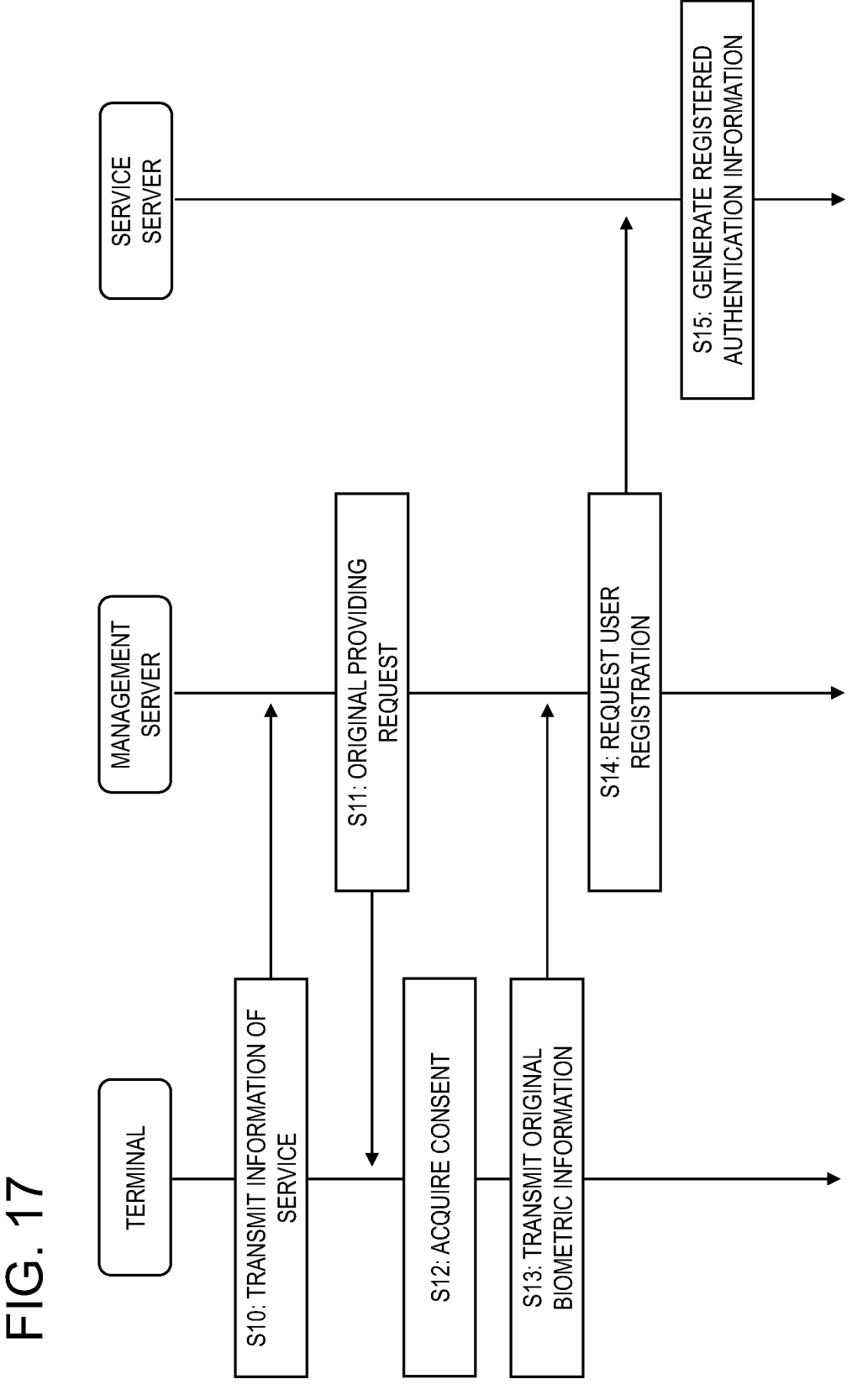
FIG. 17 is a sequence diagram illustrating an example of an operation in the authentication system according to the first example embodiment.

Next, operations in the authentication system according to the first example embodiment will be described. Note that the description of the operation related to account genera-
tion, or the like is omitted. FIG. 17 is a sequence diagram
illustrating an example of an operation in the authentication
system according to the first example embodiment.

The terminal 40 transmits information of a service
selected by a user (information of a service provider from
whom the user wants to receive the biometric authentication
service) to the management server 10 (transmits information
of the service; step S10).

When the user selects the service that he/she wishes to
receive, the management server 10 transmits the original
providing request to the terminal 40 of the user (step S11).
That is, after the user selects a service provider, the man-
agement server 10 makes a request for original providing
request for original biometric information to the terminal 40
possessed by the user.

Upon receiving the original providing request, the termi-
nal 40 acquires consent of the user before providing the
original biometric information (step S12).

Once the consent of the user is acquired, the terminal 40
transmits the original biometric information (for example,
face image) to the management server 10 (step S13). That is,
the terminal 40 owned by the user, transmits the original
biometric information to the management server 10 when
the user consents to the original biometric information being
provided to the service provider.

The management server 10 transmits a user registration
request including the acquired original biometric informa-
tion, a user ID of the user and individual identification
information, and so on to the service server 20 of the service
provider selected by the user (step S14).

The service server 20 generates authentication informa-
tion for registration (registered authentication information)
from the acquired original biometric information (step S15).
The generated registered authentication information is reg-
istered in the user management database.

Next, variations according to the first example embodi-
ment will be described.

Variation 1

The service server 20 may acquire information necessary
for authentication of a person to be authenticated from the
terminal 40 of a person to be authenticated. For example,
when entering an event venue, if it is necessary to check
health information of a visitor (presence or absence of
vaccination against infectious diseases, negative proof), the
service server 20 may acquire the health information from
the terminal 40 via the authentication terminal 30. Alterna-
tively, the service server 20 may acquire ticket information
and business information necessary for product payment via
the authentication terminal 30, or may acquire these busi-
ness information via the terminal 40 and the management
server 10.

In this case, the authentication terminal 30 transmits an
"accompanying information providing request" to the ter-
minal 40. Upon receiving the accompanying information
providing request, the terminal 40 transmits information
specified by the authentication terminal 30 (for example,
vaccination certificate or negative certificate) to the authen-
tication terminal 30.

The authentication terminal 30 transmits to the service
server 20 the acquired vaccination certificate together with
the biometric information of a person to be authenticated.

The service server 20 authenticates the person to be
authenticated using the business information (for example,
ticket information) of the person to be authenticated and the acquired vaccination certificate. For example, the service
server 20 determines that the authentication is successful
when the person to be authenticated has purchased a valid
ticket and the vaccination certificate is valid.

In this way, the service server 20 may authenticate the
person to be authenticated using the accompanying infor-
mation acquired from the terminal 40 of the person to be
authenticated.

Variation 2

The service provider (service server 20) may temporarily
or permanently store the registered authentication informa-
tion if explicit consent is acquired from a user.

For example, when the user selects a service, the user may
instruct the service provider how to handle the registered
authentication information by the service provider. Specifi-
cally, when the user selects a service provider, the terminal
40 may display a GUI or other means to inquire about
"whether or not to retain the registered authentication infor-
mation" (see FIG. 18). Alternatively, the terminal 40 may
display a GUI or other information that asks the user how
long the service provider can retain the registered authenti-
cation information and the time limit for which it can be
retained.

The instructions regarding the handling of user authenti-
cation information are transmitted to the service server 20
with the user registration request. The service server 20
follows the instructions and defines the handling of the
registered authentication information.

For a convenience of a user, the terminal 40 may also
make suggestions regarding the handling of the registered
authentication information and other information. For
example, with respect to a procedure in which one-time
procedure such as checking in at a hotel, entering an event
venue, or boarding an airplane is finished and business
information becomes unnecessary, the terminal 40 suggests
to the user a deletion of registered authentication informa-
tion. On the other hand, the same business information is
used repeatedly with respect to time and attendance at the
office. In this case, the terminal 40 proposes to the user to
leave at least the registered authentication information in the
service server 20.

In this way, depending on the service provider's business
type and type of business, the registered authentication
information may be held in the service server 20, or may be
deleted upon completion of the authentication process. That
is, it may be determined for each service provider whether
or not the registered authentication information (feature
value) is permanently retained. It may be determined
whether or not the registered authentication information is
deleted when the use of the registered authentication infor-
mation ends (authentication succeeds).

Variation 3

As explained above, the management center (the man-
agement server 10) and the service provider (the service
server 20), in principle, delete the original biometric infor-
mation (for example, face image) of a user. However, the
management server 10 and the service server 20 may store
the original biometric information (for example, face
images) temporarily or permanently if explicit consent is
acquired from the user.

When storing the original biometric information, the
management server 10 may provide the original biometric information to a service provider selected by a user upon receiving a request from the service provider.

For example, consider a case where a service provider does not store the original biometric information and has changed an authentication algorithm adopted by the company. In this case, the service provider (the service server 20) transmits the original biometric information including a user ID of a user to the management server 10. The management server 10 transmits the original biometric information corresponding to the acquired user ID to the service server 20.

The service server 20 generates registered authentication information that conforms to a newly adopted authentication algorithm using the acquired original biometric information.

The management server 10 may acquire consent from a user to provide the original biometric information before providing the original biometric information to the service server 20. The management server 10 transmits the original biometric information to the service server 20 only when the user gives consent.

In addition, when the service server 20 holds the original biometric information, and the authentication algorithm adopted by the company is changed, the service server 20 may generate the registered authentication information (feature value) for a newly adopted authentication algorithm using the held original biometric information. In this way, in principle, the service server 20 deletes the original biometric information (face image) after calculating the registered authentication information (feature value). However, the service server 20 may hold the original biometric information (face image) with the consent of a user.

When the management server 10 does not hold the original biometric information (for example, face image) and receives the request regarding a providing of the original biometric information from the service server 20 due to a change in an authentication algorithm adopted by the service provider, the management server 10 may request the terminal 40 to provide the original biometric information. That is, when the management server 10 does not hold a face image, the management server 10 may inquire of the terminal 40 of a user to acquire the face image each time the management server 10 receives the request from the service server 20. The management server 10 may transmit the acquired face image to the service server 20.

Variation 4

Figure 19:
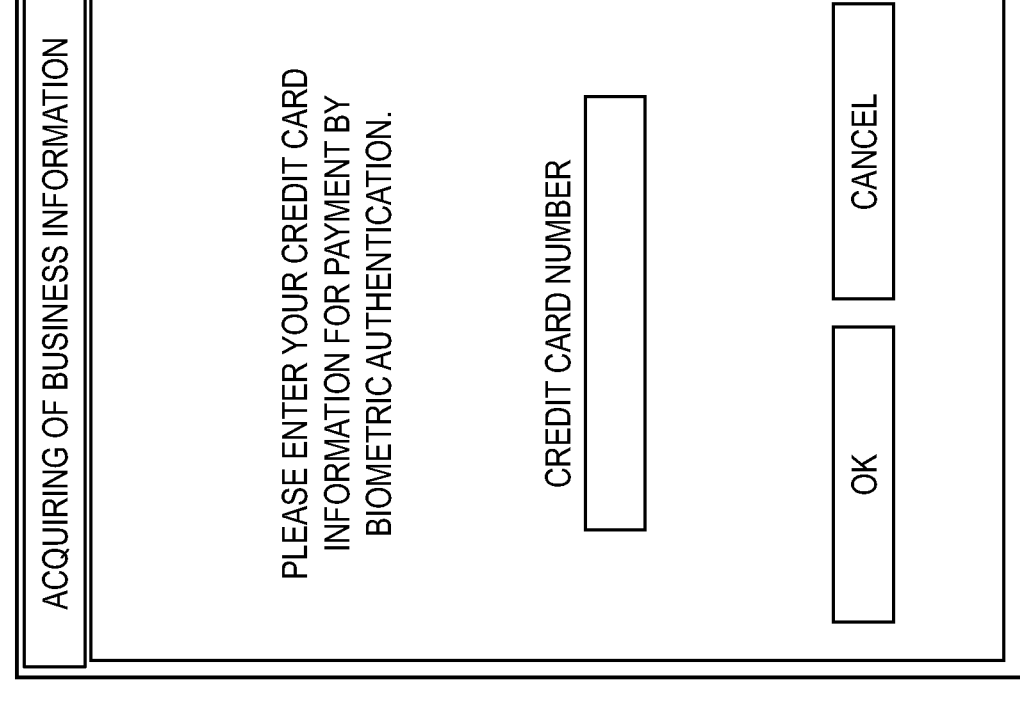
FIG. 19 is a diagram illustrating an example of a display of the terminal according to a variation of the first example embodiment.

When a user selects a service provider, the authentication system of the present application may acquire the business information required by the selected service provider. For example, when a user wishes to select a service from a retailer, the terminal 40 may acquire the business information (for example, credit card information) to provide to the retailer. In this way, the terminal 40 uses a GUI shown in FIG. 19 to acquire the credit card information.

The terminal 40 transmits the acquired business information (for example, the credit card information) along with the original biometric information of the user to the management server 10.

Alternatively, when the user selects an event business operator, the terminal 40 may connect to a ticket sales site provided by the event business operator. When the user purchases a ticket, the terminal 40 acquires ticket information for the ticket purchased by that user from the ticket sales site.

The terminal 40 transmits the above acquired ticket information along with the original biometric information of the user to the management server 10. The management server 10 transmits the user registration request including the original biometric information of the user and the ticket information to the service server 20.

In this way, the terminal 40 may acquire business information regarding the service provider selected by the user and transmit the acquired business information together with the original biometric information to the management server 10.

As described above, in the authentication system according to the first example embodiment, the original biometric information (for example, face image) necessary for biometric authentication is stored in the terminal 40 of a user. When the user wishes to receive biometric authentication service, and after the user selects a service provider, the original biometric information stored in the terminal 40 is provided to the selected service provider (the service provider requiring the registered authentication information). Once the user registers his/her biometric information (for example, face image) within the terminal 40, the user can receive each service without registering his/her biometric information with each service (various service locations). That is, once the user takes a picture of his/her own face, the user can use the face authentication service without registering his/her face again in various places (services). In other words, with single registered authentication information, the biometric information can be applied to various solutions using biometric authentication.

In addition, the above configuration also solves various problems that arise when a service provider provides biometric authentication service. In the existing system, service providers were required to have users register their face images for each service location (service). However, in the system according to the first example embodiment, it is sufficient for a user to perform a single face registration. This configuration significantly reduces the burden of face registration induction. In addition, the service provider does not need to hold the original biometric information (face image). This configuration reduces a burden on the service provider against information leakage, or the like. In particular, when the same service provider employs a plurality of face authentication algorithms, the service provider does not need to possess face image for each authentication algorithm. This configuration reduces management risk for the service provider. In addition, by storing the original biometric information by the management center with consent of a user, the service provider can change a face authentication engine adopted by the company or adopt a new face authentication engine that is more suitable for the own services. That is, service providers are not limited to a face authentication engine of a specific vendor but can adopt the face authentication engines of various vendors suitable for their applications. As a result, service providers can avoid business risk of being overly dependent on one vendor (one face authentication engine). That is, service providers participating in the authentication system according to the present application can easily support a plurality of vendors.

In addition, from a user's point of view, there is no need to register face images many times regardless of the same service (same service provider). Therefore, user convenience is improved. In addition, the original biometric information (face image) is kept in one's own terminal 40, and one's face image is not held by an external company or the like. Therefore, anxiety about information leakage or the like is reduced. That is, the user can receive the biometric authentication service with peace of mind.

Next, a hardware configuration of an individual apparatus that constitutes the authentication system will be described.

Figure 20:
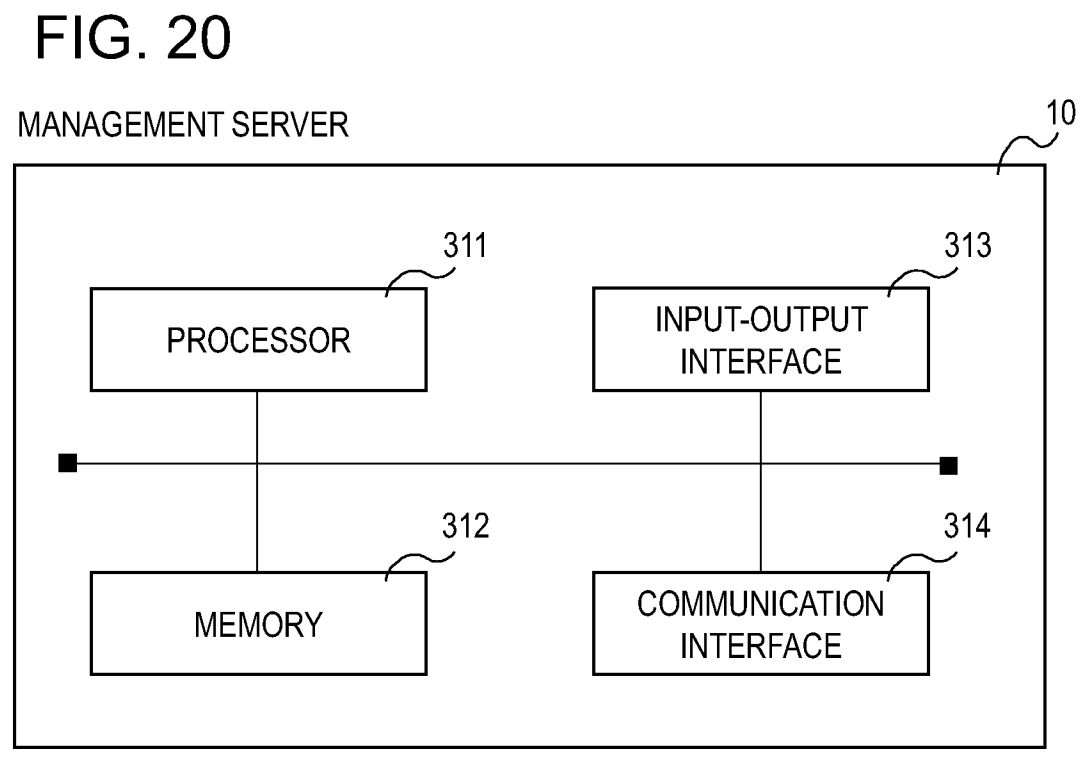

FIG. 20 is a diagram illustrating an example of a hardware configuration of the management server 10.

The management server 10 can be configured by an information processing apparatus (a so-called computer) and has a configuration illustrated as an example in FIG. 20. For example, the management server 10 includes a processor 311, a memory 312, an input-output interface 313, a communication interface 314, and so on. These components such as the processor 311 are connected to an internal bus or the like and configured to communicate with each other.

The hardware configuration of the management server 10 is not limited to the configuration illustrated in FIG. 20. The management server 10 may include hardware not illustrated or may be configured without the input-output interface 313 if desired. In addition, the number of components, such as the number of processors 311, included in the management server 10 is not limited to the example illustrated in FIG. 20. For example, a plurality of processors 311 may be included in the management server 10.

For example, the processor 311 is a programmable device such as a CPU (Central Processing Unit), an MPU (Micro Processing Unit), or a DSP (Digital Signal Processor). Alternatively, the processor 311 may be a device such as an FPGA (Field Programmable Gate Array) or an ASIC (Application Specific Integrated Circuit). The processor 311 executes various kinds of programs including an operating system (OS).

The memory 312 is a RAM (Random Access Memory), a ROM (Read-Only Memory), an HDD (Hard Disk Drive), an SSD (Solid State Drive), or the like. The memory 312 stores an OS program, an application program, and various kinds of data.

The input-output interface 313 is an interface for a display device and an input device not illustrated. For example, the display device is a liquid crystal display or the like. For example, the input device is a device, such as a keyboard or a mouse, which receives user operations.

The communication interface 314 is a circuit, a module, or the like that communicates with other apparatuses. For example, the communication interface 314 includes a NIC (Network Interface Card) or the like.

The functions of the management server 10 are realized by various kinds of processing modules. The processing modules are realized by, for example, causing the processor 311 to execute a program stored in the memory 312. In addition, this program can be recorded in a computer-readable storage medium. The storage medium may be a non-transient (non-transitory) storage medium, such as a semiconductor memory, a hard disk, a magnetic recording medium, or an optical recording medium. That is, the present invention can be embodied as a computer program product. In addition, the above program may be updated by downloading a program via a network or by using a storage medium in which a program is stored. In addition, the above processing modules may be realized by semiconductor chips.

As is the case with the management server 10, the service server 20, the authentication terminal 30 and the terminal 40 can each be configured by an information processing apparatus, and the basic hardware configuration of the service server 20, the authentication terminal 30 and terminal 40 is the same as that of the management server 10. Thus, description of the basic hardware configuration of the service server 20, the authentication terminal 30 and terminal 40 will be omitted. For example, the authentication terminal 30 may be equipped with a camera device for photographing a person to be authenticated.

The management server 10, which is an information processing apparatus, includes a computer and can realize its functions by causing the computer to execute a program. In addition, the management server 10 executes an authentication server control method by using this program. Similarly, the terminal 40, which is an information processing apparatus, includes a computer and can realize its functions by causing the computer to execute a program. In addition, the terminal 40 executes a terminal control method by using this program.

Variations

The configurations, operations, and so on of the authentication systems according to the above example embodiments are examples and do not limit the present system configuration, and so on.

In the above embodiment, an operation of an authentication system is described using "face" of a person as an example of biometric information. However, the authentication system of the present application can also use other types of biometric information. For example, data with physical characteristics unique to the individual, such as fingerprints, voice prints, veins, retinas, and iris patterns of the eyes, may be used. That is, the biometric information of a user may be any information including physical features of the user.

The service server 20 may provide data acquired by authenticating a user to the management server 10. Specifically, the service server 20 transmits a user ID of the user and behavioral information (for example, date and time of successful authentication, location of successful authentication, products purchased, and so on) acquired from the biometric authentication to the management server 10. The management server 10 may integrate the behavioral information acquired from each service provider based on the user ID of the user and generate the behavioral history of the user in question. The generated behavioral history may be utilized by the management server 10 or may be sold to other business operators after being anonymized or otherwise processed. Management center operator and other service business operators can analyze the behavioral history of users, which they cannot acquire on their own, and provide information (information distribution) that takes into account the preferences, location, time, and so on of the users. That is, the behavioral history of user may be utilized in the advertising business.

The management center may acquire a service fee for the authentication system from the service provider. The service fee may be determined based on the number of users registered with the service provider. Alternatively, the service fee may be determined based on the number of authentications at the service provider.

In the above embodiment, it was explained that terminal 40 continues to retain the original biometric information (for example, face image) of the user in question unless explicitly instructed by the user. However, the terminal 40 may request (instruct) the user to update the retained original biometric information at regular or predetermined timing. That is, a person's face (physiognomy) changes over time, most notably in children. The terminal 40 requests the user to update the registered biometric information on a regular or at a predetermined timing, taking into account the facial changes.

Alternatively, the terminal 40 may compare the face image taken by the user for SNS (Social Networking Service), and so on, with the original biometric information (face image) for biometric authentication service registration. If the similarity between the two face images has decreased, the terminal 40 may request an update of the registered face image. In this case, the terminal 40 may calculate a similarity between the two face images and request (instruct) the updating of the above original biometric information according to a result of a thresholding process for the calculated similarity.

The management server 10 may be equipped with a function to verify a quality of the original biometric information (for example, face image) provided by the terminal 40 (see FIG. 21). For example, a quality verification unit 206 shown in FIG. 21 checks a quality of a face image that a user is about to provide to the service provider. For example, the quality verification unit 206 verifies the quality of the face image based on brightness of the face image and whether the feature points (for example, eyes, nose, or the like) necessary for feature value generation are visible. The quality verification unit 206 requests the terminal 40 to retransmit the face image if the quality of the acquired face image does not meet a predetermined standard. Upon receiving the request, the terminal 40 requests the user to reacquire the face image. The quality verification unit 206 transmits the facial image (original biometric information) to the service server 20 of the service provider if the quality of the acquired facial image meets the predetermined standard. With such a configuration, it is possible to reduce a possibility that the service server 20 downstream of the management server 10 fails in the registration process (feature value generation process).

Figure 23:
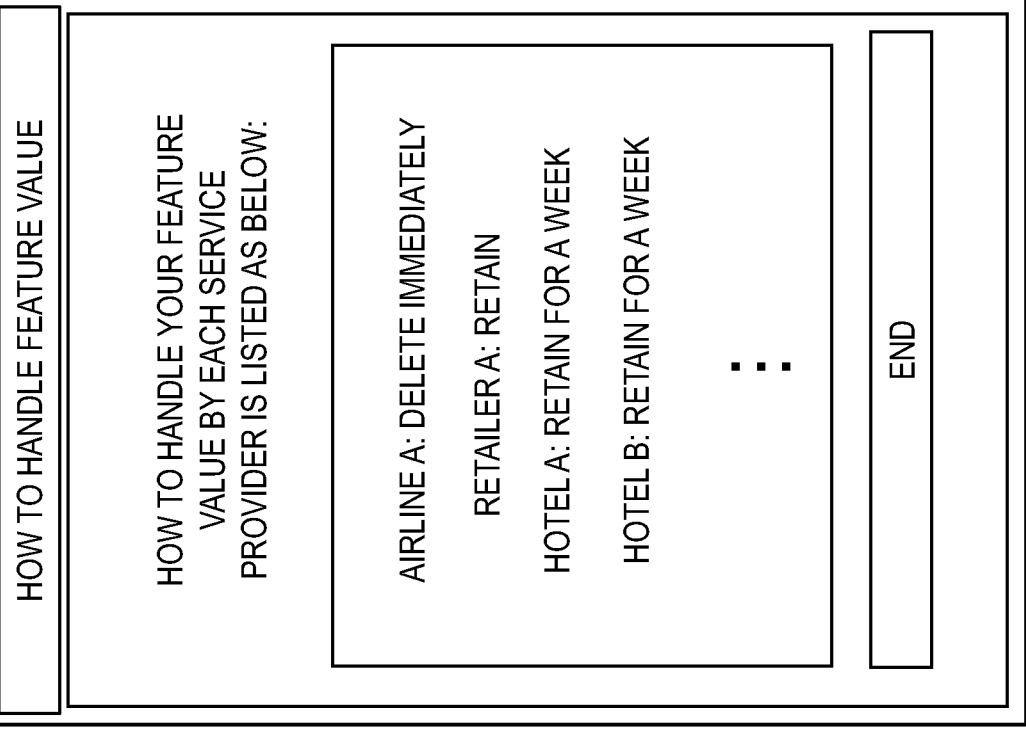
FIG. 23 is a diagram illustrating an example of a display of the terminal according to a variation in the present application disclosed.

The terminal 40 of a user may display list information that allows the user to immediately grasp how each service provider treats original biometric information and registered authentication information (for example, permanent retention, predetermined period retention, immediate deletion). For example, as shown in FIG. 22, the terminal 40 may display a list of how the original biometric information is handled by each business operators (for example, management center, service provider). Alternatively, as shown in FIG. 23, the terminal 40 may display a list of how each service provider handles registered authentication information (for example, feature value).

For example, while the above example embodiments have been described based on a case in which an account management database is established in the management server 10, the account management database may be established in an externally installed database server. That is, some functions of the management server 10 may be implemented in another server. More specifically, the "service selection control unit (service selection control means)" and so on described above can be implemented in any of the apparatuses included in the system.

The management server 10 may verify an identity of a user when generating an account. Specifically, the management server 10 acquires an identification document (for example, a passport, a driver's license, or the like) in which biometric information is described, and the biometric information together with the login information of the user and the like. The management server 10 performs one-to-one matching using the biometric information of the identification document and the biometric information acquired from the user. When the matching is successful, the management server 10 may perform user registration (system registration) of the user who succeeded in the personal identification.

While the data exchange between the management server 10, the service server 20 and the authentication terminal 30 is not limited to any particular mode, data exchanged between these apparatuses may be encrypted. Biometric information and other information are transmitted and received between these apparatuses, and in order to appropriately protect this information, it is desirable that encrypted data be exchanged.

In the flowcharts and sequence diagrams used in the above description, a plurality of steps (processes) are sequentially described. However, the order of the execution of the steps performed in the individual example embodiment is not limited to the described order. In the individual example embodiment, the order of the illustrated steps may be changed to the extent that a problem is not caused on the content of the individual example embodiment. For example, individual processes may be executed in parallel.

The above example embodiments have been described in detail to facilitate the understanding of the present application disclosed and not to mean that all the configurations described above are needed. In addition, if a plurality of example embodiments have been described, each of the example embodiments may be used individually or a plurality of example embodiments may be used in combination. For example, part of a configuration according to one example embodiment may be replaced by a configuration according to another example embodiment. For example, a configuration according to one example embodiment may be added to a configuration according to another example embodiment. In addition, addition, deletion, or replacement is possible between part of a configuration according to one example embodiment and another configuration.

The industrial applicability of the present invention has been made apparent by the above description. That is, the present invention is suitably applicable, for example, to information processing system that provides biometric authentication service.

A part or the entirety of the example embodiments described above may be described as in the following supplementary notes, but is not limited to the followings.

Supplementary Note 1

A system, including:

a plurality of first servers operated by each of a plurality of service providers providing services using biometric authentication;

a second server that manages biometric authentication of each of the plurality of service providers; and a terminal that stores original biometric information that is an original of authentication information used for biometric authentication, wherein the terminal transmits the original biometric information to the second server in response to a request from the second server, wherein the second server transmits the original biometric information to the first server of the service provider selected by the user from among the plurality of service providers, and wherein the first server generates authentication information for registration from the original biometric information.

Supplementary Note 2

The system according to supplementary note 1, wherein the second server holds information of each of the plurality of service providers and allows the user to select the service provider.

25 26

Supplementary Note 3

The system according to supplementary note 2,
wherein the second server requests the terminal to provide
the original biometric information after the user selects
the service provider.

Supplementary Note 4

The system according to supplementary note 3,
wherein the terminal transmits the original biometric
information to the second server when consent of the
user to a provision of the original biometric information
to the service provider is acquired.

Supplementary Note 5

The system according to supplementary note 4, further
including a plurality of authentication terminals installed at
respective service providing locations of the plurality of
service providers,
wherein among the plurality of authentication terminals,
an authentication terminal installed at the service pro-
viding location visited by a person to be authenticated
transmits an authentication request including biometric
information of the person to be authenticated to the first
server corresponding to the service providing location
visited by the person to be authenticated.

Supplementary Note 6

The system according to supplementary note 5,
wherein the first server that has received the authentica-
tion request generates authentication information for
matching from the biometric information included in
the authentication request, and performs authentication
processing using the generated authentication informa-
tion for matching and the authentication information
for registration.

Supplementary Note 7

The system according to supplementary note 6,
wherein each of the plurality of first servers associates and
stores business information necessary for each service
provider to provide a service using the biometric
authentication and authentication information for reg-
istration.

Supplementary Note 8

The system according to supplementary note 7,
wherein the first server that has received the authentica-
tion request determines that authentication is success
when the business information of the person to be
authenticated identified by the matching process using
the authentication information for registration and the
authentication information for matching are valid.

Supplementary Note 9

The system according to any one of supplementary notes
1 to 8,
wherein the biometric information is a face image of a
person.

Supplementary Note 10

The system according to supplementary note 9,
wherein the terminal does not delete the stored original
biometric information if there is no instruction from the
user.

Supplementary Note 11

The system according to supplementary note 10,
wherein the plurality of first servers and the second server
delete the received original biometric information if
there is no instruction from the user.

Supplementary Note 12

A terminal, including:
a storage unit for storing original biometric information
that is an original of authentication information used
for biometric authentication; and
a transmitting unit for transmitting the original biometric
information to a management server, the management
server managing biometric authentication for each of a
plurality of service providers that provide services
using biometric authentication, in response to a request
from the management server.

Supplementary Note 13

A control method of a terminal, the method including:
storing original biometric information that is an original
of authentication information used for biometric
authentication; and
transmitting the original biometric information to a man-
agement server, the management server managing bio-
metric authentication for each of a plurality of service
providers that provide services using biometric authen-
tication, in response to a request from the management
server.

Supplementary Note 14

A computer-readable storage medium storing a program
causing a computer mounted on a terminal to perform
processing for:
storing original biometric information that is an original
of authentication information used for biometric
authentication; and
transmitting the original biometric information to a man-
agement server, the management server managing bio-
metric authentication for each of a plurality of service
providers that provide services using biometric authen-
tication, in response to a request from the management
server.

The entire disclosure of the above patent literature is
incorporated herein by reference thereto. While the example
embodiments of the present invention have thus been
described, the present invention is not limited to these
example embodiments. It is to be understood to those skilled
in the art that these example embodiments are only examples
and that various variations are possible without departing
from the scope and sprit of the present invention. That is, the
present invention of course includes various variations and
modifications that could be made by those skilled in the art
in accordance with the overall disclosure including the
claims and the technical concept.

REFERENCE SIGNS LIST 10 management server
20 service server
30 authentication terminal
40 terminal
101 first server
102 second server
103 terminal
201 communication control unit
202 account management unit
203 business operator management unit
204 service selection control unit
205 storage unit
206 quality verification unit
301 communication control unit
302 business information management unit
303 user registration control unit
304 authentication unit
305 storage unit
311 processor
312 memory
313 input-output interface
314 communication interface
401 communication control unit
402 biometric information acquisition unit
403 authentication request unit
404 function realization unit
405 storage unit
501 communication control unit
502 account generation control unit
503 original information acquiring unit
504 service selection unit
505 storage unit

What is claimed is:

1. A system comprising:
a plurality of first servers respectively operated by each of a plurality of service providers providing services using biometric authentication;
a second server that manages the biometric authentication of the plurality of service providers; and
a terminal that stores original biometric information that is an original of authentication information used for the biometric authentication,
wherein the terminal acquires information related to a first service provider selected by a user from among the plurality of service providers and transmits the acquired information, to the second server,
wherein the first service provider has a corresponding first server,
wherein the second server acquires the original biometric information from the terminal in response to acquiring the information, and transmits the original biometric information to the corresponding first server of the first service provider, and
wherein the corresponding first server generates authentication information for registration based on the original biometric information,
wherein the terminal outputs, in a case where the original biometric information is provided to the second server, to the user a suggestion regarding an instruction to be given to the selected service provider based on a type of the first service provider selected by the user, and transmits, in a case where the user agrees to the output suggestion, the original biometric information and the instruction, wherein the second server transmits the original biometric information and the instruction to the corresponding first server of the first server, and
wherein the corresponding first server handles the generated authentication information based on the instruction.

2. The system according to claim 1,
wherein the second server holds information of each of the plurality of service providers and allows the user to select the first service provider.

3. The system according to claim 2,
wherein the second server requests the terminal to provide the original biometric information after the user selects the first service provider.

4. The system according to claim 3,
wherein the terminal transmits the original biometric information to the second server when consent of the user to a provision of the original biometric information to the first service provider is acquired.

5. The system according to claim 4, further comprising a plurality of authentication terminals installed at respective service providing locations of the plurality of service providers,
wherein among the plurality of authentication terminals, an authentication terminal installed at the service providing location visited by a person to be authenticated transmits an authentication request including biometric information of the person to be authenticated to the first server corresponding to the service providing location visited by the person to be authenticated.

6. The system according to claim 5,
wherein the first server that has received the authentication request generates authentication information for matching from the biometric information included in the authentication request, and performs authentication processing using the generated authentication information for matching and the authentication information for registration.

7. The system according to claim 6,
wherein each of the plurality of first servers associates and stores business information necessary for each service provider to provide a service using the biometric authentication and authentication information for registration.

8. The system according to claim 7,
wherein the first server that has received the authentication request determines that authentication is successful when the business information of the person to be authenticated identified by a matching process using the authentication information for registration and the authentication information for matching are valid.

9. The system according to claim 1, wherein the biometric information is a face image of a person.

10. The system according to claim 9,
wherein the terminal does not delete the stored original biometric information if there is no instruction from the user.

11. The system according to claim 10,
wherein the plurality of first servers and the second server delete the received original biometric information if there is no instruction from the user.

12. The system according to claim 1,
wherein the terminal acquires from the user a period or deadline for which the first service provider is permitted to retain the authentication information for registration when the user selects the first service provider, and transmits the acquired period or deadline to the corresponding first server of the first service provider, and wherein the first server stores the authentication information for registration in accordance with the period or deadline.

13. The system according to claim 1, wherein the second server does not transmit the original biometric information to a second service provider that is not selected by the user from among the plurality of service providers.

14. A control server that manages biometric authentication of each of a plurality of service providers respectively operating a plurality of services using the biometric authentication, the plurality of service providers providing services using the biometric authentication, the control server comprising:

at least one memory storing a set of instructions; and at least one processor configured to execute the set of instructions to:

acquire original biometric information that is an original of authentication information from a terminal, wherein the terminal acquires information related to a first service provider selected by a user from among the plurality of service providers, in response to acquiring the information from the terminal, wherein the first service provider has a corresponding first server; and transmit the original biometric information to the corresponding first server of the first service provider, wherein the corresponding first server generates authentication information for registration based on the original biometric information, wherein the terminal outputs, in a case where the original biometric information is provided to a second server, to the user a suggestion regarding an instruction to be given to the selected service provider based on a type of the first service provider selected by the user, and transmits, in a case where the user agrees to the output suggestion, the original biometric information and the instruction, wherein the second server transmits the original biometric information and the instruction to the corresponding first server of the first server, and wherein the corresponding first server handles the generated authentication information based on the instruction.

15. A control method performed by a control server that manages biometric authentication of each of a plurality of service providers respectively operating a plurality of services using the biometric authentication, the plurality of service providers providing services using the biometric authentication, the control method comprising:

acquiring original biometric information that is an original of authentication information from a terminal, wherein the terminal acquires information related to a first service provider selected by a user from among the plurality of service providers, in response to acquiring the information from the terminal, wherein the first service provider has a corresponding first server; and transmitting the original biometric information to the corresponding first server of the first service provider, wherein the corresponding first server generates authentication information for registration based on the original biometric information, wherein the terminal outputs, in a case where the original biometric information is provided to a second server, to the user a suggestion regarding an instruction to be given to the selected service provider based on a type of the first service provider selected by the user, and transmits, in a case where the user agrees to the output suggestion, the original biometric information and the instruction, wherein the second server transmits the original biometric information and the instruction to the corresponding first server of the first server, and wherein the corresponding first server handles the generated authentication information based on the instruction.

16. A non-transitory computer-readable storage medium storing a program executable by a control server to perform processing comprising:

acquiring original biometric information that is an original of authentication information from a terminal, wherein the terminal acquires information related to a first service provider selected by a user from among the plurality of service providers, in response to acquiring the information regarding the first service provider from the terminal, wherein the first service provider has a corresponding first server; and transmitting the original biometric information to the corresponding first server of the first service provider, wherein the corresponding first server generates authentication information for registration from the original biometric information, wherein the terminal outputs, in a case where the original biometric information is provided to a second server, to the user a suggestion regarding an instruction to be given to the selected service provider based on a type of the first service provider selected by the user, and transmits, in a case where the user agrees to the output suggestion, the original biometric information and the instruction, wherein the second server transmits the original biometric information and the instruction to the corresponding first server of the first server, and wherein the corresponding first server handles the generated authentication information based on the instruction.

17. A method performed in a system, wherein the system includes:

a plurality of first servers respectively operated by a plurality of service providers providing services using biometric authentication;

a second server that manages the biometric authentication of each of the plurality of service providers; and a terminal that stores original biometric information that is an original of authentication information used for the biometric authentication, and wherein the method comprises:

acquiring, by the terminal, information related to a first service provider selected by a user from among the plurality of service providers;

transmitting, by the terminal, the acquired information related to the first service provider, the first service provider having a corresponding first server, to the second server;

acquiring, by the second server, the original biometric information from the terminal in response to acquiring, the information related to the first service provider, wherein the first service provider has a corresponding first server;

transmitting, by the second server, the original biometric information to the corresponding first server of the first service provider; and generating, by the corresponding first server, authentication information for registration based on the original biometric information, wherein the terminal outputs, in a case where the original biometric information is provided to the second server, to the user a suggestion regarding an instruction to be given to the selected service provider based on a type of the first service provider selected by the user, and transmits, in a case where the user agrees to the output suggestion, the original biometric information and the instruction, wherein the second server transmits the original biometric information and the instruction to the corresponding first server of the first server, and wherein the corresponding first server handles the generated authentication information based on the instruction.

\* \* \* \* \*